(12) United States Patent
Kraft et al.

(10) Patent No.: US 12,117,247 B2
(45) Date of Patent: Oct. 15, 2024

(54) HEAT STORAGE DEVICE

(71) Applicant: DEUTSCHES ZENTRUM FÜR LUFT-UND RAUMFAHRT E.V., Bonn (DE)

(72) Inventors: Werner Kraft, Stuttgart (DE); Peter Vetter, Stuttgart (DE); Veronika Stahl, Leonberg (DE)

(73) Assignee: DEUTSCHES ZENTRUM FÜR LUFT-UND RAUMFAHRT E.V., Bonn (DE)

( * ) Notice: Subject to any disclaimer, the term of this patent is extended or adjusted under 35 U.S.C. 154(b) by 233 days.

(21) Appl. No.: 17/910,009

(22) PCT Filed: Mar. 10, 2021

(86) PCT No.: PCT/EP2021/054390
§ 371 (c)(1),
(2) Date: Sep. 8, 2022

(87) PCT Pub. No.: WO2021/185536
PCT Pub. Date: Sep. 23, 2021

(65) Prior Publication Data
US 2023/0140947 A1    May 11, 2023

(30) Foreign Application Priority Data

Mar. 18, 2020   (DE) .................. 10 2020 107 464.6

(51) Int. Cl.
*F28D 15/00*    (2006.01)
*F28D 20/02*    (2006.01)
(52) U.S. Cl.
CPC ................. *F28D 20/021* (2013.01)

(58) Field of Classification Search
CPC ..................................................... F28D 20/021
(Continued)

(56) References Cited

U.S. PATENT DOCUMENTS 6,397,618 B1    6/2002   Chu et al.
2009/0250189 A1* 10/2009  Soukhojak ............ F28D 9/0031
                                                    126/400
(Continued)

FOREIGN PATENT DOCUMENTS

DE    102009006784 A1    7/2010
EP        3002428 A1    4/2016
(Continued)

OTHER PUBLICATIONS

International Search Report (Jun. 30, 2021) for corresponding International App. PCT/EP2021/054390.
(Continued)

*Primary Examiner* — Davis D Hwu
(74) *Attorney, Agent, or Firm* — WRB-IP PLLC

(57) ABSTRACT

A heat accumulator device is provided having a metal phase-change material as an accumulator material, the heat accumulator device including at least one a holding chamber having a holding space for the accumulator material, a housing for the holding space, at least one heat input apparatus for inputting heat into the at least one holding chamber, and at least one heat output apparatus for outputting heat from the at least one holding chamber. A coupling region of the heat input apparatus, provided for thermal coupling to the accumulator material, and/or a coupling region of the heat output apparatus, provided for thermal coupling to the accumulator material, is arranged, at least in part, at a distance from the accumulator material.

21 Claims, 21 Drawing Sheets

(58) Field of Classification Search
USPC .................................................. 165/104.17
See application file for complete search history.

(56) References Cited

U.S. PATENT DOCUMENTS

| | | |
|---|---|---|
| 2011/0083436 A1 | 4/2011 | White et al. |
| 2011/0308762 A1 | 12/2011 | Spero et al. |
| 2014/0000583 A1 | 1/2014 | Kotze |

FOREIGN PATENT DOCUMENTS

| | | | | |
|---|---|---|---|---|
| JP | 2015052423 A | * | 3/2015 | |
| WO | 2011031894 A2 | | 3/2011 | |
| WO | 2012123853 A1 | | 9/2012 | |
| WO | WO-2016099290 A1 | * | 6/2016 | ............. F01K 3/186 |

OTHER PUBLICATIONS

German Official Action (Oct. 30, 2020) for corresponding German App. 10 2020 107 464.6.

\* cited by examiner

HEAT STORAGE DEVICE

BACKGROUND AND SUMMARY

The invention relates to a heat storage device having a metallic phase change material as the storage material.

The use of thermal energy stores based on metallic phase change materials is known from the literature. These are predominantly located in the field of application of solar thermal power plants. Further applications are in the field of storage furnaces for building heating, in the field of conventional steam power plants (coal-fired power plant, nuclear power plant), for use in catalytic converters in vehicles having internal combustion engines, for use in thermoelectric generators in vehicles having internal combustion engines, and in the field of heat reclamation in steel production. Typically, the concepts presented in the literature are experimental setups on a laboratory scale. Furthermore, the application in vehicles, in particular in battery-electric buses and passenger vehicles, has been described.

It is desirable to specify a heat storage device having a metallic phase change material as the storage material, which enables effective heat storage with an effective heat introduction and effective heat discharge.

A heat storage device having a metallic phase change material as the storage material is proposed, comprising at least one receptacle chamber having a receptacle space for the storage material and a housing for the receptacle space, at least one heat introduction unit for introducing heat into the at least one receptacle chamber, and at least one heat discharge unit for discharging heat from the at least one receptacle chamber.

According to an aspect of the invention, a coupling region of the heat introduction unit provided for thermal coupling with the storage material and/or a coupling region of the heat discharge unit provided for thermal coupling with the storage material are arranged spaced apart at least in regions from the storage material.

A high-temperature heat store can be implemented using the heat storage device according to an aspect of the invention. In particular, the heat storage takes place via latent heat and sensible heat using the metallic phase change material, also known as mPCM. In the phase transition, the metallic phase change material can absorb thermal energy in the solid phase without temperature change until the metallic phase change material is completely melted or emit thermal energy in the liquid phase until the metallic phase change material is completely solidified.

Heat and in particular latent and sensible heat can be stored for a longer period of time via the metallic phase change material. In particular, heat can be stored at a high temperature level, which is, for example, at least 100° C., preferably at least 500° C., and in particular approximately 600° C. to 650° C. Depending on the type of the metallic phase change material (mPCM), heat can be stored at a temperature level of up to 1500° C. For example, pure silicon having a phase change temperature of 1414° C. or $SiB_3$ having a phase change temperature of 1385° C. can be used.

Depending on the thermal charging state, the metallic phase change material is in the liquid state or the solid state. A favorable phase change material is, for example, $AlSi_{12}$.

If, for example, $AlSi_{12}$ is used as a metallic phase change material in the temperature interval from 25° C. to 600° C., it has an energy density of approximately 300 Wh/kg or approximately 795 Wh/l.

Typical metallic phase change materials mentioned in the literature have high mass proportions of the elements aluminum, magnesium, or zinc. A typical feature of phase change materials in general and thus also of metallic phase change materials is the change in volume over the phase change. Furthermore, metallic phase change materials having high proportions of aluminum, magnesium, or zinc have relatively high coefficients of thermal expansion in the order of magnitude of approximately 20 to $30*10^{-6}$ 1/K, especially in comparison to the other materials typically used for the construction of heat storage devices, for example for the housing or electric heaters such as stainless steel, graphite, or ceramics.

During the charging of a heat store based on metallic phase change materials, the temperature in the storage material first rises and then, when the melting temperature is reached, the storage material melts. During the heating of the storage material, the storage material present in the solid phase expands, and during the melting process, it expands over the phase change. During the discharge, these processes take place in the opposite sequence, i.e., there is a reduction in volume during the phase change and contraction during the cooling process.

Due to the volume change during the phase change, cavities (material defects having negative pressure or vacuum) can form, in particular in the regions of the storage material of the heat accumulator that solidify last. Likewise, pores (material defects having gas inclusions) can preferably be located in regions of the storage material that solidify last.

As the storage material cools down, it typically shrinks more than the other components, such as electrical heaters or housing. The reason for this is the high coefficient of thermal expansion of the storage materials.

Both effects can lead to a disadvantageous change in the thermal contact between the storage material and the heat introduction unit or heat discharge unit. In addition to performance, this can also adversely affect the service life of the components, particularly when using electrical resistance heaters. These effects can occur if the physical principles involved in the formation of material defects are not taken into consideration when arranging the components.

According to one favorable embodiment, an arrangement of the heat introduction unit and the heat discharge unit to ensure thermal contact between the heat introduction unit and the storage material and between the heat discharge unit and the storage material can be selected such that when the heat storage device is used as intended, cavities and/or pores are formed distant from heat introduction unit and heat discharge unit in the regions of the storage material that solidify last. As a result, a disadvantageous change in the thermal contact between the storage material and the heat introduction unit or heat discharge unit can be made more difficult or prevented. This can have a positive influence on the service life of the components.

In comparison to the prior art, the heat storage device according to an aspect of the invention has a favorable arrangement of the heat introduction unit and the heat discharge unit, so that cavities do not occur at the heat introduction unit, particularly not at the coupling region, and at the heat discharge unit, particularly not at the coupling region.

The arrangement of the heat introduction unit and the heat discharge unit can advantageously be selected in such a way that gravity has a positive influence on the formation of cavities and pores.

According to one favorable embodiment, thermal contact between the heat introduction unit or heat discharge unit and the storage material can advantageously be ensured by a skilled arrangement of these components in relation to one another in the storage system, in particular in the storage material. The solidification of the storage material starting from the heat discharge unit in conjunction with the associated reduction in volume as well as the resulting effects due to the different coefficients of thermal expansions of the components used are taken into consideration for this purpose. Furthermore, the influence of installations in the storage material on the effective thermal conductivity within the heat storage device and the associated influence on the solidification of the storage material is taken into consideration.

Furthermore, the arrangement of the heat introduction unit and the heat discharge unit can be selected such that the thermal contact between the storage material and the heat introduction unit or the heat discharge unit is additionally improved due to the coefficients of thermal expansion.

The phase change material can advantageously have a greater coefficient of thermal expansion than a material of the housing.

According to one advantageous embodiment, the housing of the storage material can be formed from fiber-reinforced ceramic material. In particular, the housing can be formed from a fiber-reinforced non-oxidic ceramic material. The fiber-reinforced non-oxidic ceramic material can in particular be formed from carbon fiber-reinforced carbon and/or carbon fiber-reinforced silicon carbide and/or silicon carbide fiber-reinforced carbon and/or silicon carbide fiber-reinforced silicon carbide (SiC). Such a material has a very low coefficient of thermal expansion. Thin walls can be implemented via the fiber reinforcement.

Other possible housing materials are ceramics, for example, aluminum oxide, zirconium oxide, boron nitride, silicon oxide, aluminum nitride, silicon carbide, boron carbide, and the like, and/or such a ceramic as a functional layer on a metallic substrate, for example, and/or graphite or graphite as a functional layer and/or surface-treated metals, for example, boronized stainless steel, and/or temperature-treated stainless steel and/or composite materials such as fiber-reinforced ceramics having a ceramic fiber, such as C or $Al_2O_3$, and/or particle-reinforced ceramics, such as WC.

A reduced coefficient of thermal expansion in comparison to the metallic phase change material can thus be achieved in a simple manner. The housing can advantageously be implemented in a lightweight construction. Particularly thin walls of the enclosure can be formed via a fiber reinforcement.

A corresponding housing can thus advantageously be used for accommodating materials if a corresponding accommodated material is to be repeatedly heated at high heating rates and cooled at high cooling rates.

Housing materials having high thermal shock resistance, high oxidation resistance, high mechanical stability, and, in particular, high corrosion resistance are favorable. A long-term stable housing of phase change materials, which are at least temporarily molten metals, can be achieved.

Molten metals can be housed with long-term stability by the housing having corresponding wall material.

High corrosion resistance results. As a result, the housing can be used in conjunction with molten metals, the temperature of which can be in the range, for example, up to approximately 600° C. or 650° C. or even up to 1500° C.

In principle, the molten metal contained in the housing can be in the liquid state continuously, or it can be in the liquid state only temporarily. For example, the housing accommodates a metallic phase change material, which is in the liquid state, for example, during thermal charging and is in the solid state after thermal discharge. For example, both latent and sensible heat can then be stored.

It is favorable if a wall thickness of a wall region made of the wall material of the housing made of fiber-reinforced SiC material is at least 1 mm, in particular at least 2 mm, and at least in particular 2.5 mm and is for example approximately 3 mm. The wall thickness is preferably at most 5 mm. A mechanically stable wall can thus be provided, wherein a high thermal shock resistance is achieved. Furthermore, the wall thickness can be kept relatively small, so that the container device can be made light-weight.

The enclosure can be covered using a suitable thermal insulation. The insulation can include, for example, pyrogenic silicon dioxide as thermal insulation. Other materials such as mineral wool, calcium silicate, ceramic fibers (for example, calcium magnesium silicates), mica, or even vacuum insulation can also be advantageously used. Other materials that have a higher thermal conductivity but are more cost-effective can also optionally be used.

According to one favorable embodiment, the coupling region of the heat introduction unit and/or the heat discharge unit can be arranged at least in some regions outside the receptacle space. In particular, the coupling region of the heat introduction unit and/or the heat discharge unit can be arranged at least in some regions outside the receptacle chamber.

According to one favorable embodiment, the coupling region of the heat introduction unit and the coupling region of the heat discharge unit can be arranged outside of the receptacle space on a base of the housing. The coupling region of the heat introduction unit and/or the heat discharge unit can be thermally coupled to the storage material via at least one thermal bridge element, wherein the housing has the at least one thermal bridge element, in particular wherein the at least one thermal bridge element is arranged on a base plate of the housing or integrated into the base plate, or implements the base plate.

In this exemplary embodiment, both the heat introduction unit, in particular its coupling region, and the heat discharge unit, in particular its coupling region, can be located in the base surface of the heat storage device, in particular the receptacle chamber of the heat storage device.

In this way, the heat introduction unit and the heat discharge unit can be integrated directly into structural elements of the housing, such as the base plate. The components are thus not introduced directly into the receptacle chamber of the storage material. By attaching the heat discharge unit to the base, the solidification process takes place during the cooling starting from the base surface. Moreover, gravity also favors solidification towards the base surface. Since the heat introduction unit is also attached to the base surface, it is in good thermal contact with the storage material.

As a result, the heat introduction unit, in particular its coupling region, and the heat discharge unit, in particular its coupling region, can be indirectly connected. The two components are not in material contact, but are only indirectly in thermal contact with the storage material via the thermal bridge element. As a result, no unwanted chemical reaction can occur between the heat introduction unit and/or heat discharge unit and the storage material, such as corrosion.

According to one favorable embodiment, the coupling region of the heat introduction unit and/or the heat discharge unit can be arranged at least in regions inside the receptacle space. In particular, the coupling region of the heat introduction unit and/or the heat discharge unit can be arranged at least in regions inside the receptacle chamber.

According to an alternative embodiment, the coupling region of the heat introduction unit can be arranged outside of the receptacle space on a base of the housing and the coupling region of the heat discharge unit can be arranged at least in regions within the receptacle space, in particular at least in regions within the receptacle chamber. Alternatively, the coupling region of the heat discharge unit can be arranged outside of the receptacle space on a base of the housing and the coupling region of the heat introduction unit can be arranged at least in regions within the receptacle space, in particular at least in regions within the receptacle chamber. In this case, the coupling region of the heat introduction unit and/or the heat discharge unit can be thermally coupled to the storage material via at least one thermal bridge element.

For example, the heat introduction unit can be located in the storage material, and the heat discharge unit can be located on the base surface of the heat storage device, in particular the receptacle chamber of the heat storage device. By attaching the heat discharge unit to the base, the solidification process takes place during the cooling starting from the base surface. In addition, gravity also favors solidification towards the base surface. The heat introduction unit can advantageously be attached within the storage material largely perpendicularly to the heat discharge unit.

As a result, it can advantageously be arranged in parallel to the direction of heat discharge and thus in parallel to the solidification direction. In particular, the direction of solidification is crucial, which in turn depends on the heat discharge direction and thus also on the heat discharge unit. In this way, the formation of material defects on the side of the heat introduction unit facing away from the heat discharge unit can be avoided.

In another exemplary embodiment, the heat introduction unit and the heat discharge unit can also be arranged reversed. This also makes it possible to achieve favorable effects during the solidification of the storage material. By attaching the heat discharge unit in the storage material, the solidification process takes place starting from this unit. The direction of gravity promotes contact toward the base surface.

According to one favorable embodiment, the coupling region of the heat introduction unit and/or the heat discharge unit can be thermally coupled to the storage material via at least one thermal bridge element. In this exemplary embodiment, the heat introduction unit and the heat discharge unit can be connected indirectly. The two components are not in material contact, but are only indirectly in thermal contact with the storage material via the thermal bridge element. As a result, no unwanted chemical reaction can occur between the heat introduction unit and/or heat discharge unit and the storage material, such as corrosion.

According to one advantageous embodiment, the housing can have at least one thermal bridge element. In particular, the at least one thermal bridge element can be arranged on an outer jacket of the housing, in particular on a base plate of the housing, or can be integrated into the base plate. In this way, the heat introduction unit and the heat discharge unit can be integrated directly into structural elements of the housing, such as the base plate.

According to one alternative embodiment, the coupling region of the heat introduction unit and the coupling region of the heat discharge unit can be arranged at least in regions within the receptacle space, in particular can be arranged at least in regions within the receptacle chamber. The coupling region of the heat introduction unit and/or the heat discharge unit can be thermally coupled to the storage material via at least one thermal bridge element, wherein the at least one thermal bridge element can be arranged in the receptacle space.

In one exemplary embodiment, the heat introduction unit and the heat discharge unit can be connected indirectly. The two components are not in material contact, but are only indirectly in thermal contact with the storage material via the thermal bridge element. As a result, no unwanted chemical reaction can occur between the heat introduction unit and/or heat discharge unit and the storage material, such as corrosion.

According to one favorable embodiment, at least one thermal bridge element can be arranged in the receptacle space. The thermal bridge element can advantageously enable the supply of heat into the metallic phase change material or the emission of heat from the metallic phase change material and ensure stable thermal conditions. The thermal bridge element can include, for example, thermally conductive ribs that protrude into the phase change material.

In this embodiment, the heat introduction unit and the heat discharge unit are not introduced directly into the storage material, but rather into an enclosure as a thermal bridge element, which in turn is introduced into the storage material. As a result, the heat introduction unit and the heat discharge unit themselves do not have to be embodied as material-compatible with the storage material. Only the enclosure has to have material compatibility with the storage material.

Due to the introduction of the heat introduction unit and the heat discharge unit into the same enclosure, the storage material always solidifies around the enclosure. This ensures good thermal contact with the storage material for both the heat introduction unit and the heat discharge unit.

According to one advantageous embodiment, the storage material can comprise a metallic alloy having one or more of the components aluminum, silicon, copper, magnesium, zinc, germanium, in particular an AlSi alloy, preferably AlSi12.

The phase change material can advantageously comprise a metallic alloy or semi-metallic alloy having one or more of the components aluminum, silicon, copper, magnesium, boron, zinc, in particular an AlSi alloy, preferably $AlSi_{12}$. Favorable alloys are eutectic alloys and intermetallic compounds, for example various silicides, in which the phase change takes place with the absorption or emission of latent heat.

Also favorable are in particular binary alloys or ternary alloys and alloy systems having more than three components, having a eutectic composition or an intermetallic composition having at least one of the above-mentioned components Al, Si, Cu, Mg, B, Zn.

According to one advantageous embodiment, the heat introduction unit can have at least one heating device. In particular, the heating device can includes an electrical resistance heater or inductive heater. Alternatively, the heat introduction unit can be coupled to a heating device. In this way, thermal charging can be achieved in a simple manner. For example, no heat transfer medium has to flow through the receptacle chamber for heat introduction. For example, a thermal charge can be achieved by applying an electrical charge to the heating device. The heat from the heat storage device can then be used directly in an application, for example for heating purposes.

According to one advantageous embodiment, a heat transfer medium can flow through the heat discharge unit. In particular, the heat discharge unit can comprise or be connected to at least one pipe through which a heat transfer medium flows. A cross section of the pipe can be round, polygonal, square. A circular cross section results in a high degree of symmetry. A rectangular cross section results in a large surface. The pipe can also be designed as a hollow flat element. The heat transfer medium can thus be transported to a heat exchanger where the medium can appropriately emit the transported heat. The thermal storage device can be discharged. This heat can then be used at a location spaced apart from the receptacle chamber.

According to one favorable embodiment, the coupling region of the heat introduction unit can be arranged on a side of the coupling region of the heat discharge unit facing away from the housing. The coupling region of the heat discharge unit can also be arranged on a side of the coupling region of the heat introduction unit facing away from the housing. For example, the heat introduction unit can be arranged directly on the base plate of the housing, while the heat discharge unit is arranged on the heat introduction unit. During discharging, the heat is then transported through the heat introduction unit to the heat discharge unit.

According to favorable embodiments, the heat introduction unit can have at least one element having the coupling region, having at least one of the embodiments:
- the coupling region can essentially comprise an entire length of the element in the receptacle space and/or an entire circumference of the element and/or an entire circumference of the element in the receptacle space;
- the coupling region can extend over at least 50%, in particular over at least 60% of a total height of the receptacle space;
- the element or the coupling region of the element can be spaced apart from the housing. In particular, one end of the element can be spaced apart from a cover and/or base of the housing;
- the element or the coupling region of the element can be oriented in parallel to an element of the heat discharge unit;
- the element or the coupling region of the element can be oriented in parallel to a vertical axis or axis of symmetry of the receptacle space;
- the element or the coupling region of the element can be arranged centrally in the receptacle space and in particular can lie on an axis of symmetry of the receptacle space.

In this way, the heat introduction unit can be formed from individual elements which introduce heat into the storage material in a favorable manner.

In particular, heat can be coupled directly via the at least one element into the storage material. For example, a phase transition from solid to liquid can be achieved. Latent and sensible heat can then be stored in the storage material.

The extension over essentially the entire length/the entire circumference and/or over the entire surface results in effective heat introduction into the storage material. Electric heaters often have dead zones for the heating at a starting region and/or end region. Due to such design-related dead zones, it is not possible to heat the entire length, but only a significant part of it.

In particular, the at least one element is arranged so that it is surrounded by storage material and, for example, storage material (above all liquid) is also located between an end and a cover and/or base. As a result, heat can be effectively coupled into the storage material and effective thermal loading of the heat storage device results. Solid storage material occupies a smaller volume than liquid storage material. Due to the spacing apart from the cover and/or base, the at least one element does not protrude beyond storage material, even in the solid state. This reduces the risk of the at least one element overheating.

According to one favorable embodiment, the at least one element can be arranged inclined, in particular perpendicularly, to an orientation of the at least one heat discharge unit, and/or can be arranged in parallel to a direction of gravity in the intended working state. Furthermore, the at least one element can be arranged in parallel to an orientation of the at least one heat discharge unit. In this way, favorable melting processes of the storage material as well as advantageous solidification processes can be achieved during the discharge of the heat. In addition, gravity also promotes solidification towards the base surface. The heat introduction unit can advantageously be attached within the storage material largely perpendicularly to the heat discharge unit. In this way, the formation of material defects on the side of the heat introduction unit facing away from the heat discharge unit can be avoided.

According to one favorable embodiment, the heat discharge unit can have at least one element having the coupling region, having at least one of the embodiments:
- the coupling region can essentially comprise an entire length of the element in the receptacle space and/or an entire circumference of the element and/or an entire circumference of the element in the receptacle space;
- the coupling region can extend over at least 50%, in particular over at least 60% of a total height of the receptacle space;
- the element or the coupling region of the element can be spaced apart from the housing. In particular, one end of the element can be spaced apart from a cover and/or the base of the housing;
- the element or the coupling region of the element can be oriented in parallel to an element of the heat introduction unit;
- the element or the coupling region of the element can be oriented in parallel to a vertical axis or axis of symmetry of the receptacle space;
- the element or the coupling region of the element can be arranged centrally in the receptacle space and in particular can lie on an axis of symmetry of the receptacle space.

In this way, the heat discharge unit can be formed from individual elements which can dissipate heat from the storage material in a favorable manner.

According to one favorable embodiment, the at least one element can be designed as a pipe.

In this exemplary embodiment, the heat discharge unit can be arranged in the storage material and the heat introduction unit can be arranged on the base surface of the heat storage device, in particular the receptacle chamber of the heat storage device. By attaching the heat discharge unit in the storage material, the solidification process takes place starting from this unit and into the surrounding storage material. The direction of gravity promotes contact with the ground surface.

According to one favorable embodiment, the at least one element can be arranged centrally in the receptacle space and in particular can be arranged along an axis of symmetry of the receptacle space. In this way, favorable melting processes of the storage material as well as advantageous solidification processes can be achieved when the heat is discharged.

According to one advantageous embodiment, the heat introduction unit in the receptacle space can surround the heat discharge unit at least with a section, in particular surround it concentrically and/or in a closed manner. In particular, the heat introduction unit can be in thermal contact and/or mechanical contact with the heat discharge unit in the receptacle space. In this way, the formation of material defects on the side of the heat introduction unit facing away from the heat discharge unit can be avoided. The heat discharge unit can then also be heated directly via the heat introduction unit.

According to one advantageous embodiment, the heat introduction unit can be at least partially spaced apart in the receptacle space from the heat discharge unit, wherein storage material is arranged between the heat introduction unit and the heat discharge unit. In this way, favorable melting processes of the storage material as well as advantageous solidification processes can be achieved during the discharge of the heat. Thermal charging can thus be achieved effectively; in particular, a thermal resistance can be relatively low.

According to one favorable embodiment, the coupling region of the heat introduction unit and/or heat discharge unit can be arranged in a housing. In particular, the housing can be arranged at least in regions within the receptacle chamber and/or the receptacle space.

In this embodiment, the heat introduction unit and/or the heat discharge unit are not introduced directly into the storage material, but rather into an enclosure, which in turn is introduced into the storage material. As a result, the heat introduction unit and/or the heat discharge unit themselves do not have to be embodied as material-compatible with the storage material.

Only the enclosure has to have material compatibility with the storage material. Due to the introduction of the heat introduction unit and/or the heat discharge unit into the same enclosure, the storage material can always solidify around the enclosure. This ensures good thermal contact with the storage material for both the heat introduction unit and the heat discharge unit.

According to one favorable embodiment, a central element, in particular a central pipe, of the heat discharge unit can be arranged in the enclosure, and elements of the heat introduction unit can be arranged spaced apart from the element. In particular, the elements of the heat introduction unit can be arranged mirror symmetrically or rotationally symmetrically to the element.

In this way, favorable melting processes of the storage material as well as advantageous solidification processes can be achieved during the discharge of the heat.

According to one favorable embodiment, an element of the heat introduction unit can be arranged centrally in the housing and a plurality of elements, in particular pipes, of the heat discharge unit can be positioned spaced apart from this element. In particular, the elements of the heat discharge unit can be arranged mirror symmetrically or rotationally symmetrically to the element of the heat introduction unit. Melting processes of the storage material and also solidification processes during the discharge of the heat can also be advantageously influenced in this way.

BRIEF DESCRIPTION OF THE DRAWINGS

Further advantages will be apparent from the description of the drawings. Exemplary embodiments of the invention are shown in the drawings. The drawings, the description, and the claims contain numerous features in combination. A person skilled in the art will expediently also consider the features individually and combine them into further meaningful combinations.

DETAILED DESCRIPTION

Figure 1:
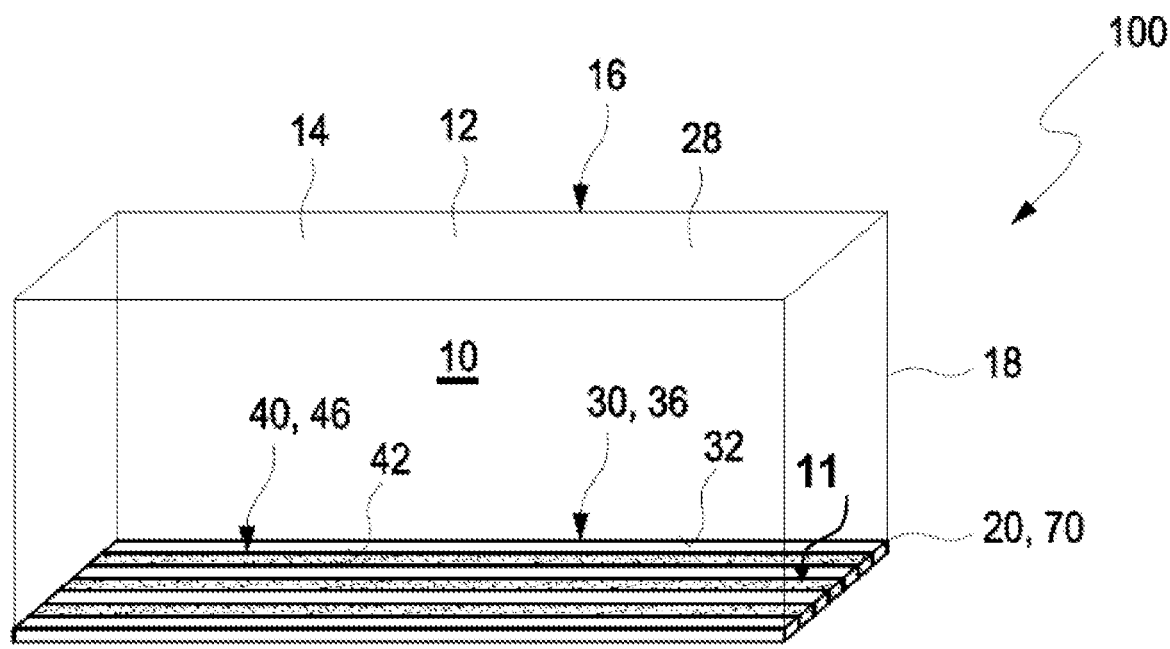
FIG. 1 shows an isometric view of a heat storage device having a flatly extending heat introduction unit and a flatly extending heat discharge unit according to one exemplary embodiment of the invention.

In the figures, identical or identically acting components are identified by the same reference signs. The figures only show examples and are not to be understood as restrictive.

Directional terminology used in the following with terms such as "left", "right", "above", "below", "in front of", "behind", "after", and the like only serves for better comprehension of the figures and is in no way intended to restrict the generality. The components and elements shown, their design and use can vary according to the considerations of a person skilled in the art and can be adapted to the respective applications.

The phase change material used as storage material 10 in the various exemplary embodiments described in the figures has a phase change temperature of at least 100° C., preferably at least 500° C. The storage material 10 can be an aluminium-silicon alloy, for example, in particular $AlS_{12}$. This material has a phase change temperature of approximately 577° C., at which the material melts at constant temperature when energy is added or solidifies when energy is removed.

In one exemplary embodiment, the housing 16 can be formed in particular from a fiber-reinforced ceramic material, for example silicon carbide, or also aluminum oxide or graphite. However, other suitable materials are also conceivable. The wall thickness can be very thin, for example 1 mm, in particular at least 2 mm, and in particular at least 2.5 mm, for example approximately 3 mm. The wall thickness is preferably at most 5 mm.

The coefficient of thermal expansion of the metallic phase change material 10 is preferably greater than that of the material of the housing 16.

In principle, the heat introduction unit 30 and the heat discharge unit 40 can each have one or more components for heat introduction or heat discharge.

A phase change of the storage material 10 resulting from the heat introduction or heat discharge starts from at least one corresponding contact region 11 of the storage material 10. The contact region 11 is in contact with the coupling region 32 of the at least one heat introduction unit 30 and/or the coupling region 42 of the at least one heat discharge unit 40. Depending on the arrangement of the coupling regions 32, 42, the contact regions 11 or the at least one contact region 11 can adjoin a base of the receptacle chamber 12. In particular, the contact regions 11 of the storage material 10 are not arranged in a region of the storage material 10 which, as intended, solidified last during a phase change resulting from the heat discharge. As a result, the contact region 11 can be free of material defects.

Figure 2:
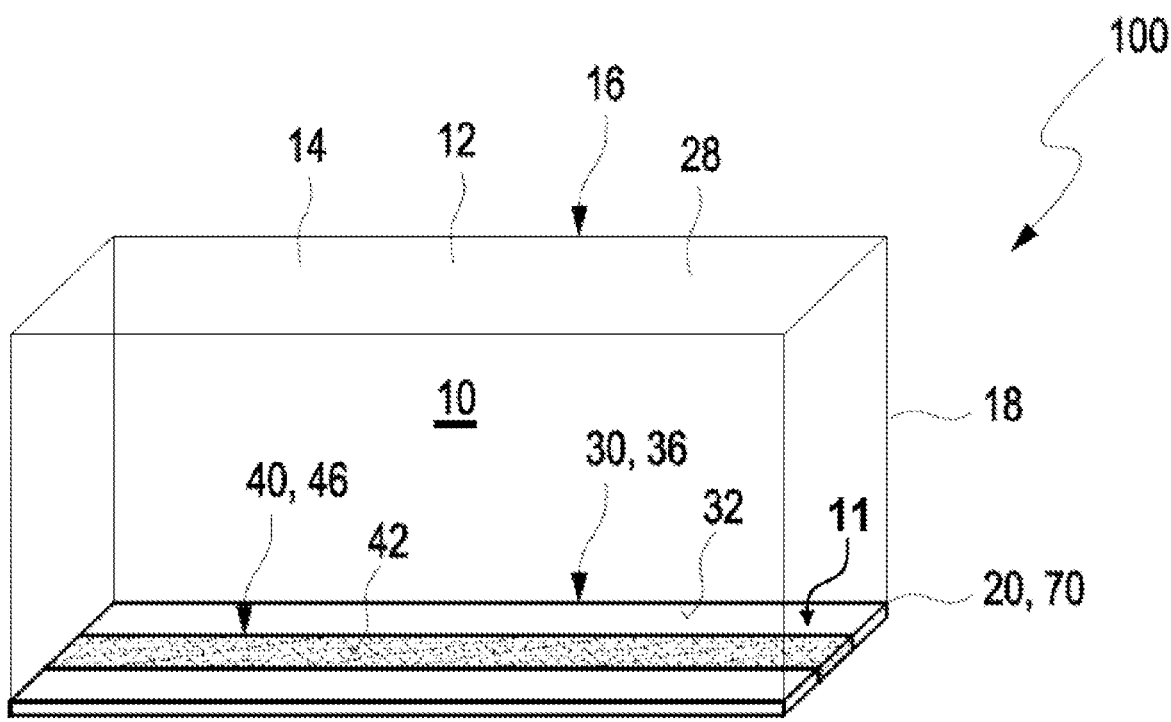
FIG. 2 shows an isometric view of a heat storage device having a flatly extending heat introduction unit and a flatly extending heat discharge unit according to another exemplary embodiment of the invention.
Figure 3:
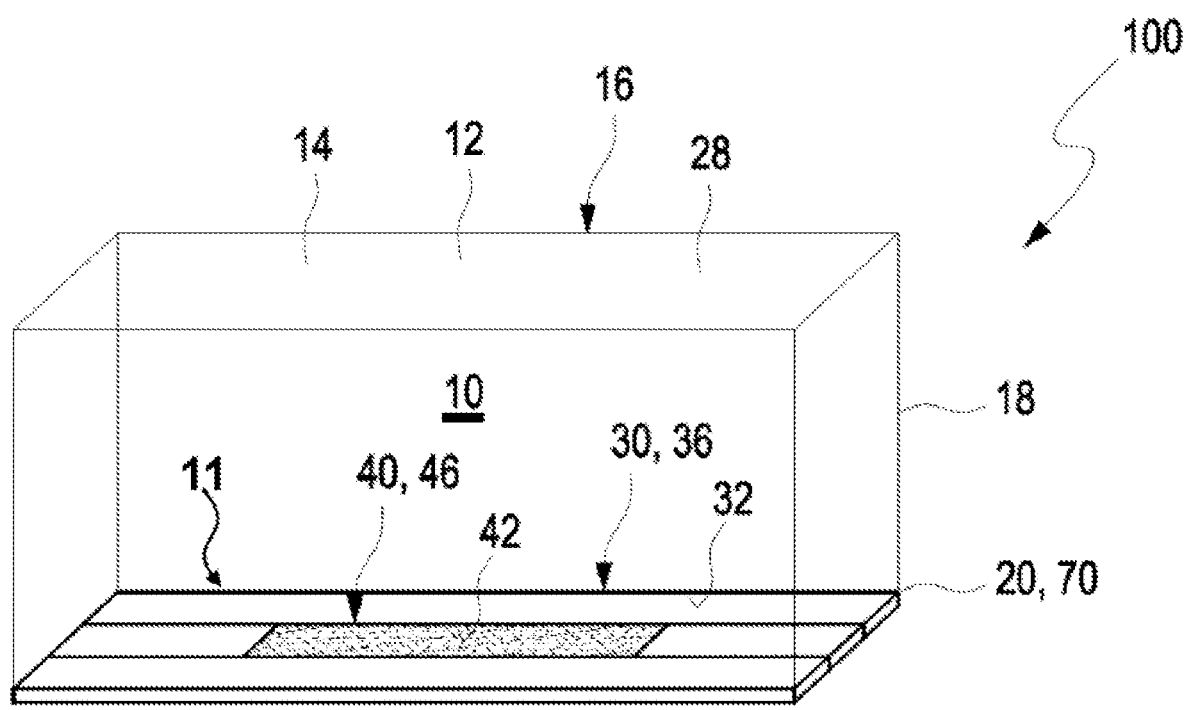
FIG. 3 shows an isometric view of a heat storage device having a flatly extending heat introduction unit and a flatly extending heat discharge unit according to another exemplary embodiment of the invention.

FIGS. 1 to 3 each show an isometric view of a heat storage device 100 having a flatly extending heat introduction unit 30 and a flatly extending heat discharge unit 40 according to various exemplary embodiments of the invention.

The heat storage device 100 having a metallic phase change material as the storage material 10 comprises a receptacle chamber 12 having a receptacle space 14 for the storage material 10 and a housing 16 for the receptacle space 14. The storage material 50 comprises a metallic alloy, for example, having one or more of the components aluminum, silicon, copper, magnesium, zinc, germanium, in particular an AlSi alloy, preferably AlSi12.

The heat storage device 100 furthermore comprises a heat introduction unit 30 for introducing heat into the at least one receptacle chamber 12, and a heat discharge unit 40 for discharging heat from the one receptacle chamber 12. A coupling region 32 of the heat introduction unit 30 provided for thermal coupling with the storage material 10 and a coupling region 42 of the heat discharge unit 40 provided for thermal coupling with the storage material 10 are arranged spaced apart at least in regions from the storage material 10.

The heat introduction unit 30 has at least one heating device 34. In particular, the heating device 34 can have a resistance heater or inductive heater or can be coupled thereto.

A heat transfer medium 48 can flow through the heat discharge unit 40, for example. In particular, the heat discharge unit 40 can comprise or be connected to at least one pipe 52 through which a heat transfer medium 58 flows. The cross section of the pipe 52 can be round, polygonal, square, for example. The pipe 52 can also be designed as a hollow flat element.

The coupling regions 32, 42 of the heat introduction unit 30 and the heat discharge unit 40 are arranged at least in regions outside of the receptacle space 14, in particular at least in regions outside of the receptacle chamber 12. This is implemented in that the coupling region 32, 42 of the heat introduction unit 30 and the heat discharge unit 40 are thermally coupled to the storage material 10 via at least one thermal bridge element 70. As a result, the coupling region 32, 42 is indirectly connected to the storage material 10 and is not directly in material contact, but is only indirectly in thermal contact with the metallic phase change material. In these exemplary embodiments, the housing 16 has the at least one thermal bridge element 70. The thermal bridge element 70 can expediently be arranged on an outer jacket 18 of the housing 16. In the exemplary embodiments shown in FIGS. 1 to 3, the thermal bridge element 70 is in particular integrated into the base plate 20 or is implemented by the base plate 20. The heat introduction unit 30 and the heat discharge unit 40 themselves are arranged at least in regions outside of the storage material 10.

In FIG. 1, the individual elements 36 of the heat introduction unit 30 and the individual elements 46 of the heat discharge unit 40 are arranged adjacent to one another in strips with their longitudinal sides and point with their coupling regions 32, 42 toward the storage material 10 in the receptacle chamber 12.

In FIG. 2, two strip-shaped elements 36 of the heat introduction unit 30 are arranged on the two longitudinal sides of a single element 46 of the heat discharge unit 40.

In FIG. 3, an element 46 of a heat discharge unit 40 is bordered by elements 36 of the heat introduction unit 30.

Figure 4:
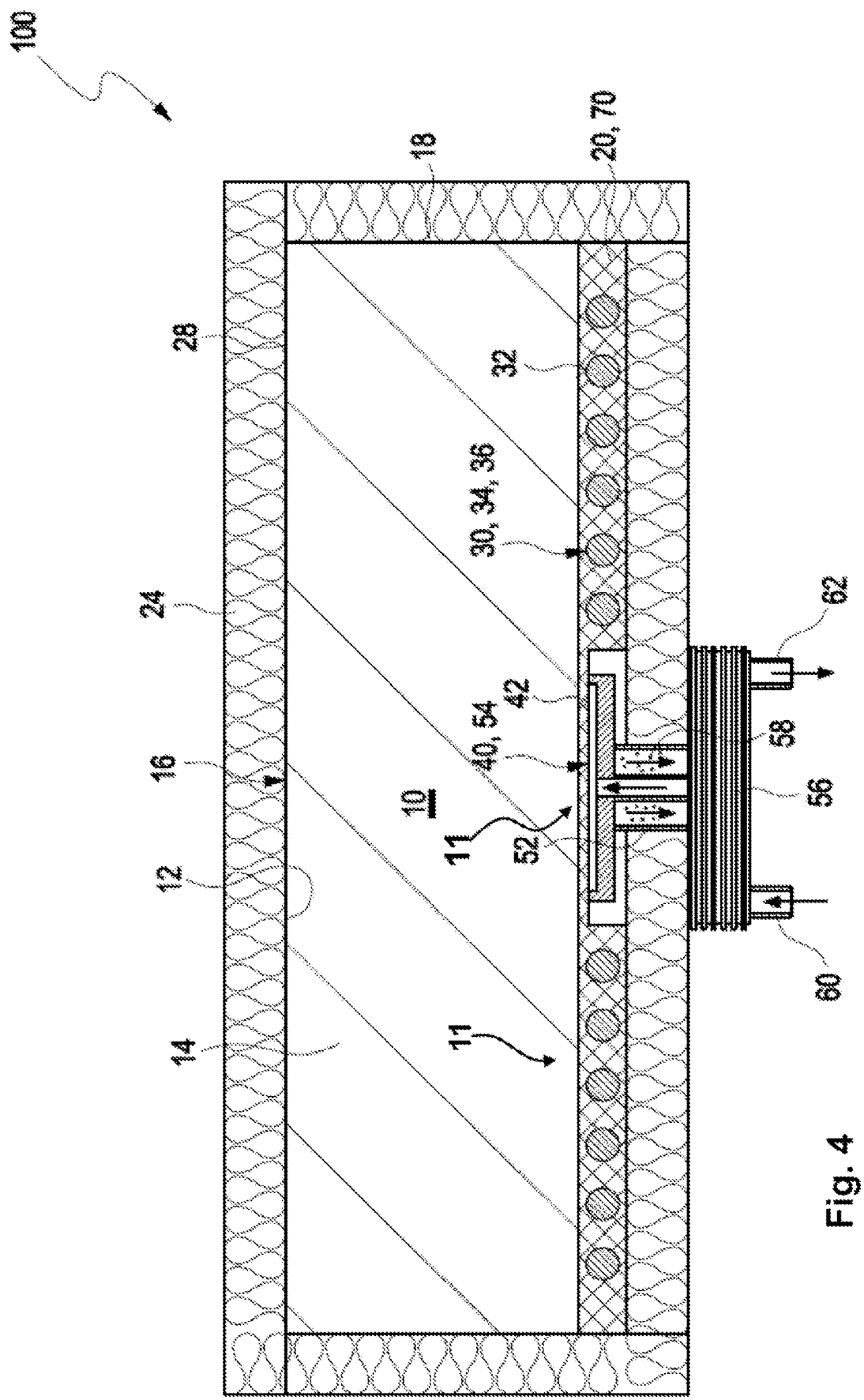
FIG. 4 shows a detailed sectional view of a heat storage device according to one exemplary embodiment of the invention.

FIG. 4 shows a detailed sectional view of a heat storage device 100 according to an exemplary embodiment of the invention having a cylindrical heat introduction unit 30 and a flatly extending heat discharge unit 40. Both components 30, 40 are arranged in the base plate 20, which acts as a thermal bridge element 70 to the storage material 10.

The coupling regions 32, 42 of the heat introduction unit 30 and the heat discharge unit 40 point toward the storage material 10 or the receptacle chamber 12, but are spaced apart therefrom by the material of the base plate 20.

The storage material 10 is arranged in the receptacle space 14 of the receptacle chamber 12. The receptacle chamber 12 is surrounded by a housing 16. The housing 16 has thermal insulation 24 on an outer side in order to be able to keep the temperature of the storage material 10 constant for as long as possible.

The heat introduction unit 30, which is integrated in the base plate 20 of the receptacle chamber 12, has individual cylindrical elements 36, which are arranged in parallel to one another and are introduced into receptacle bores of the base plate 20. The elements 36 can thus be formed as heating elements 34. For example, the heating elements 34 can have electrical heating cartridges or can be formed as such. Alternatively, however, the elements 36 can also be thermally coupled to heating elements.

The heat discharge unit 40 is designed as an evaporator unit 54 in which the heat transfer medium 58 is evaporated and is conducted as vapor through the pipe 52 to the condenser 56. The condenser 56 has coolant fittings 60, 62 for a cooling medium, by means of which the vapor can be condensed again in order to then be conducted back to the evaporator 58 as a liquid heat transfer medium 58.

Figure 5:
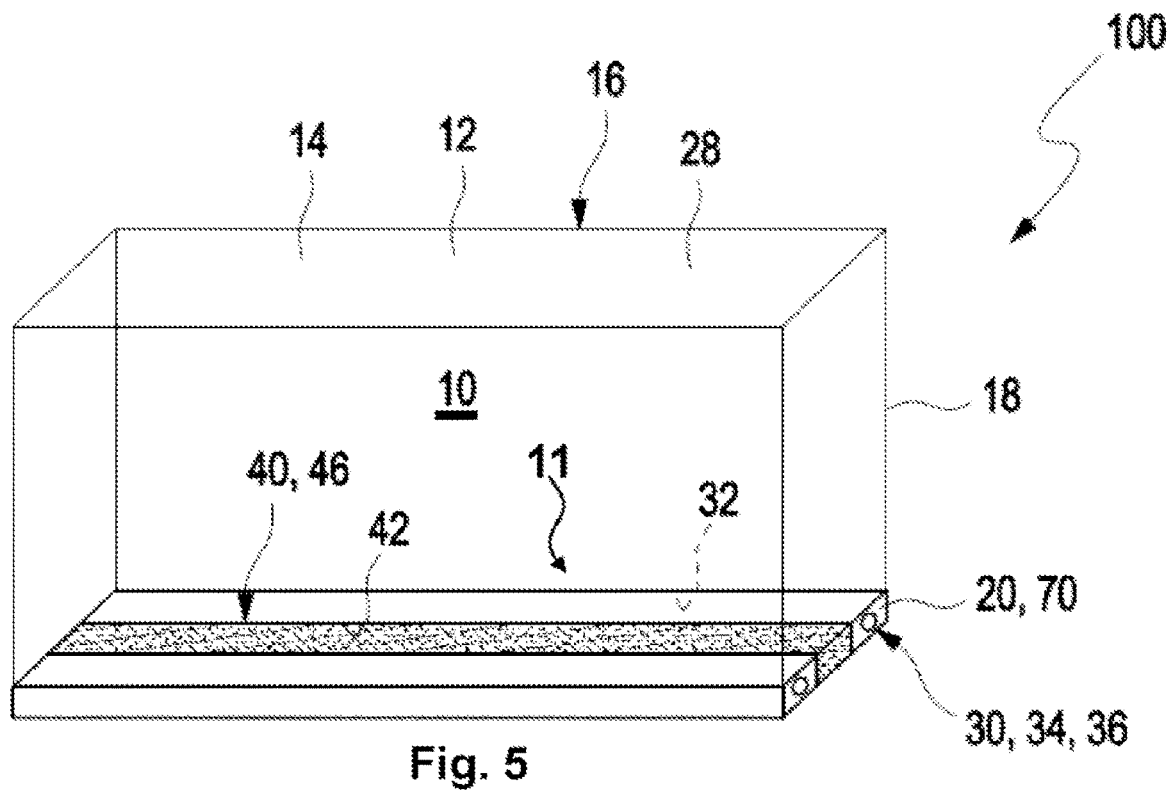
FIG. 5 shows an isometric view of a heat storage device having a cylindrical heat introduction unit and a flatly extending heat discharge unit according to another exemplary embodiment of the invention.
Figure 6:
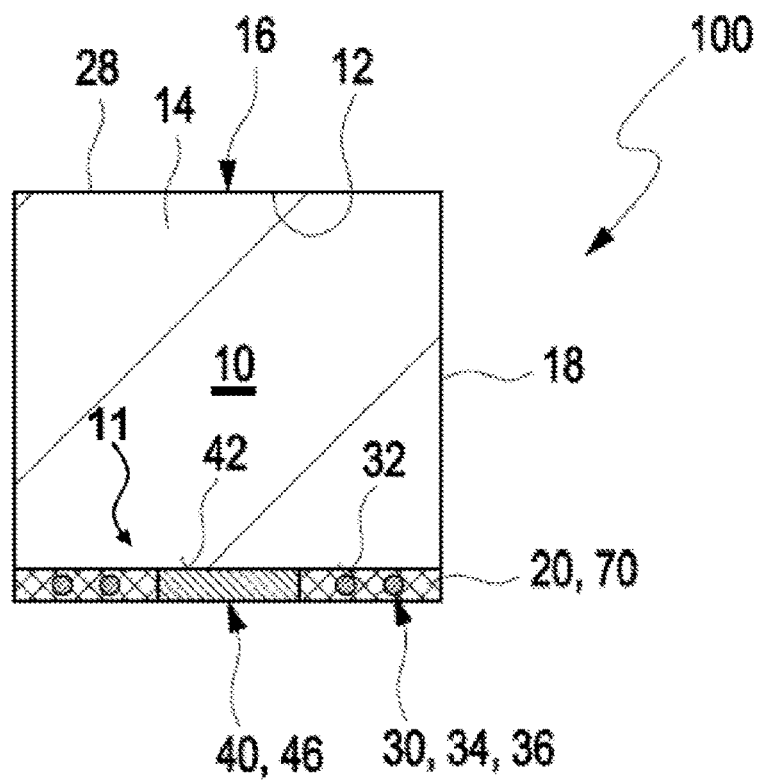
FIG. 6 shows a sectional view of a heat storage device having a cylindrical heat introduction unit and a flatly extending heat discharge unit according to another exemplary embodiment of the invention.
Figure 7:
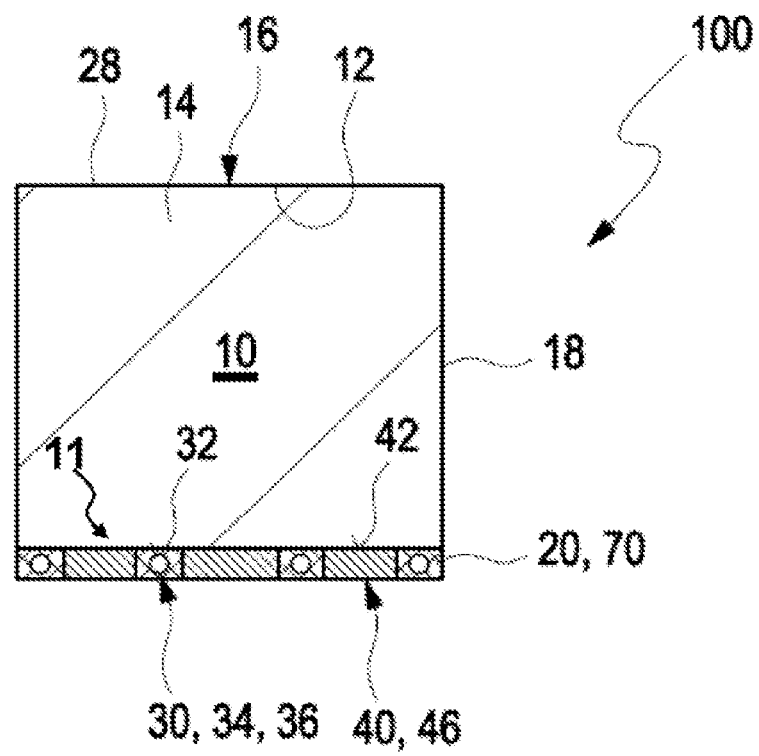
FIG. 7 shows a sectional view of a heat storage device having a cylindrical heat introduction unit and a flatly extending heat discharge unit according to another exemplary embodiment of the invention.

FIGS. 5 to 7 each show different embodiments of a heat storage device 100 having a cylindrical heat introduction unit 30 and a flatly extending heat discharge unit 40. The heat introduction unit 30 and the heat discharge unit 40 are each integrated into the base plate 20, which acts as a thermal bridge element 70 for transferring the heat from and to the storage material 10 in the receptacle chamber 12.

In the exemplary embodiment in FIG. 5, which shows an isometric view of a heat storage device 100 having a cylindrical heat introduction unit 30 and a flatly extending heat discharge unit 40, the heat discharge unit 40 is arranged as a single element 46 in the base plate 20. On both longitudinal sides of the element 46, two cylindrical elements 36 of the heat introduction unit 30 are arranged spaced apart in the base plate 20, which can be designed as heating devices 34, for example as before in the form of heating cartridges.

In the exemplary embodiment in FIG. 6, which shows a sectional view of a heat storage device 100 having a cylindrical heat introduction unit 30 and a flatly extending heat discharge unit 40, the heat introduction unit 30 has two cylindrical elements 36 of the heat introduction unit 30 in each case on both sides of the heat discharge unit 40.

In the exemplary embodiment in FIG. 7, which also shows a sectional view of a heat storage device 100 having a cylindrical heat introduction unit 30 and a flatly extending heat discharge unit 40, the heat discharge unit 40 is arranged having three elements 46 in the base plate 20. A cylindrical element 36 of the heat introduction unit 30 is arranged in each case between the flatly formed elements 46 of the heat discharge unit 40 and on the outside thereof.

The cylindrical elements 36 of the heat introduction unit 30 can be introduced into bores in the base plate 20.

Figure 8:
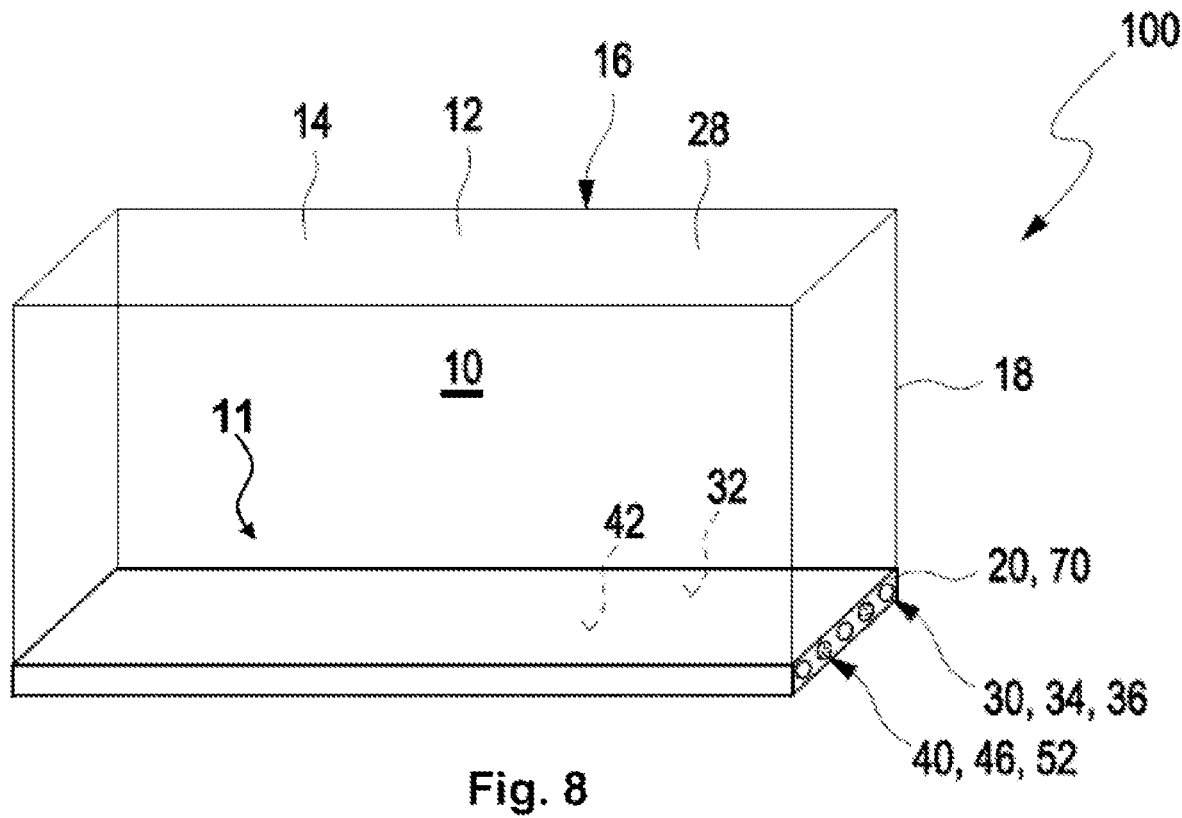
FIG. 8 shows an isometric view of a heat storage device having a cylindrical heat introduction unit and a cylindrical heat discharge unit according to another exemplary embodiment of the invention.
Figure 9:
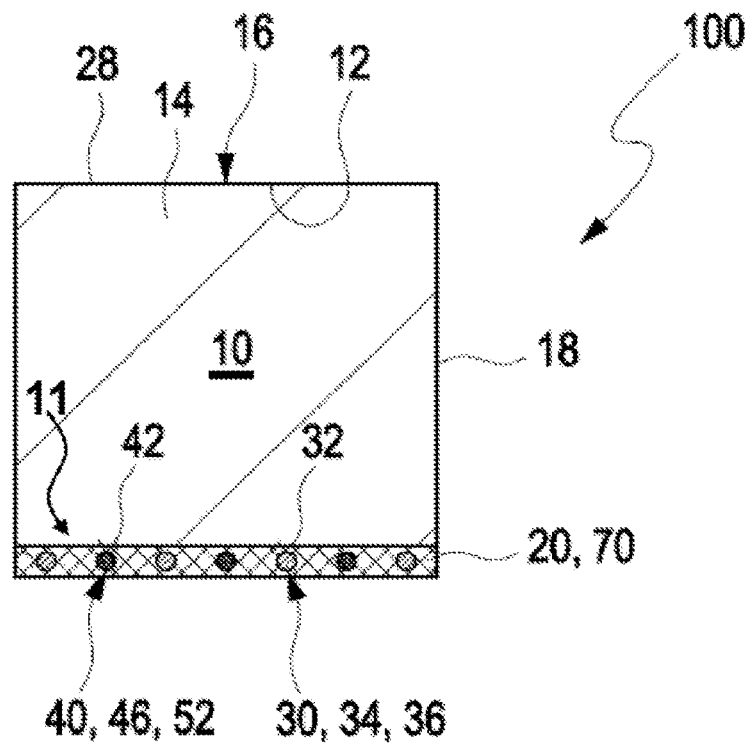
FIG. 9 shows a sectional view of a heat storage device having a cylindrical heat introduction unit and a cylindrical heat discharge unit according to another exemplary embodiment of the invention.
Figure 10:
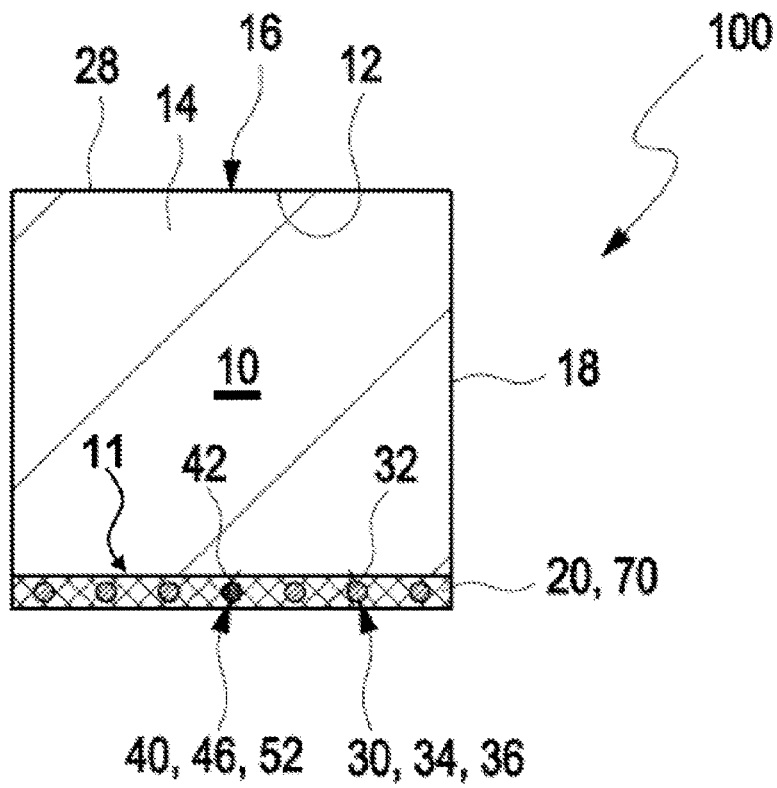
FIG. 10 shows a sectional view of a heat storage device having a cylindrical heat introduction unit and a cylindrical heat discharge unit according to another exemplary embodiment of the invention.

FIGS. 8 to 10 each show different embodiments of a heat storage device 100 having a cylindrical heat introduction unit 30 and a cylindrical heat discharge unit 40. The heat introduction unit 30 and the heat discharge unit 40 are each integrated into the base plate 20, which acts as a thermal bridge element 70 for transferring the heat from and to the storage material 10 in the receptacle chamber 12.

In the exemplary embodiment in FIG. 8, which shows an isometric view of a heat storage device 100 having a cylindrical heat introduction unit 30 and a cylindrical heat discharge unit 40, the heat introduction unit 30 is arranged having three cylindrical elements 36 in the base plate 20, which can be designed as heating devices 34, for example. A cylindrical element 46 of the heat discharge unit 40 is arranged spaced apart in the base plate 20 between the elements 36 in each case.

In the exemplary embodiment in FIG. 9, which shows a sectional view of a heat storage device 100 having a cylindrical heat introduction unit 30 and a cylindrical heat discharge unit 40, the heat introduction unit 30 has four cylindrical elements 36, between which a cylindrical element 46 of the heat discharge unit 40 is arranged in each case.

In the exemplary embodiment in FIG. 10, which also shows a sectional view of a heat storage device 100 having a cylindrical heat introduction unit 30 and a cylindrical heat discharge unit 40, the heat discharge unit 40 is arranged as a cylindrical element 46 in the base plate 20. Three cylindrical elements 36 of the heat introduction unit 30 are arranged in each case on both sides of the heat discharge unit 40.

The cylindrical elements 36 of the heat introduction unit 30 and the cylindrical elements 46 of the heat discharge unit 40 can be introduced into bores in the base plate 20.

Figure 11:
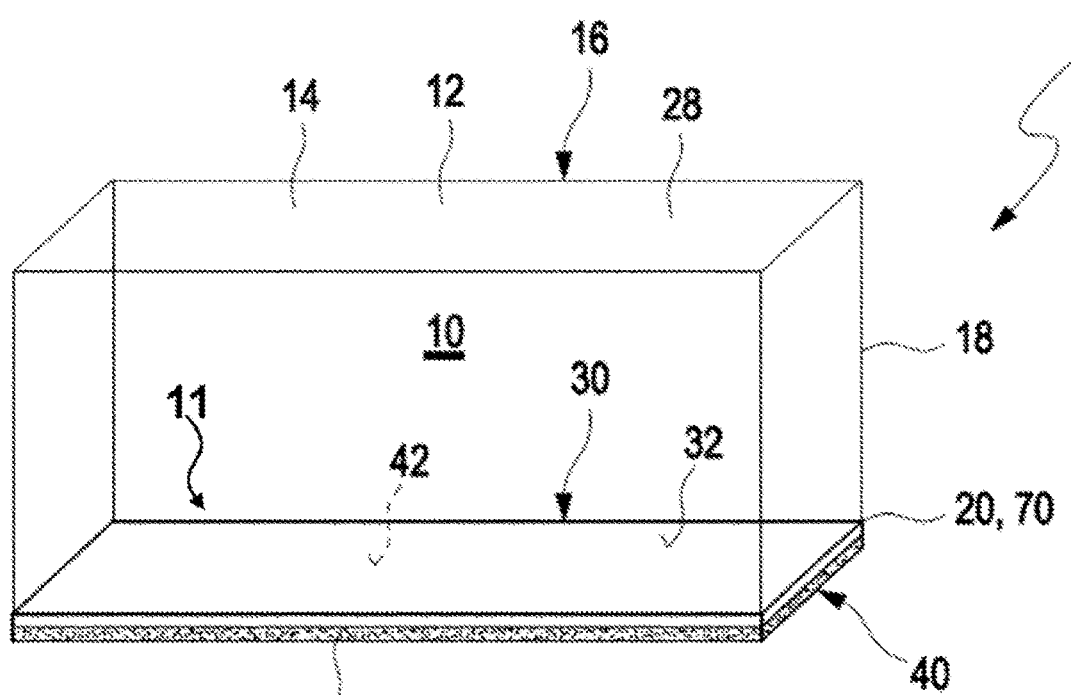
FIG. 11 shows an isometric view of a heat storage device having a flatly extending heat introduction unit and a flatly extending heat discharge unit according to another exemplary embodiment of the invention.
Figure 12:
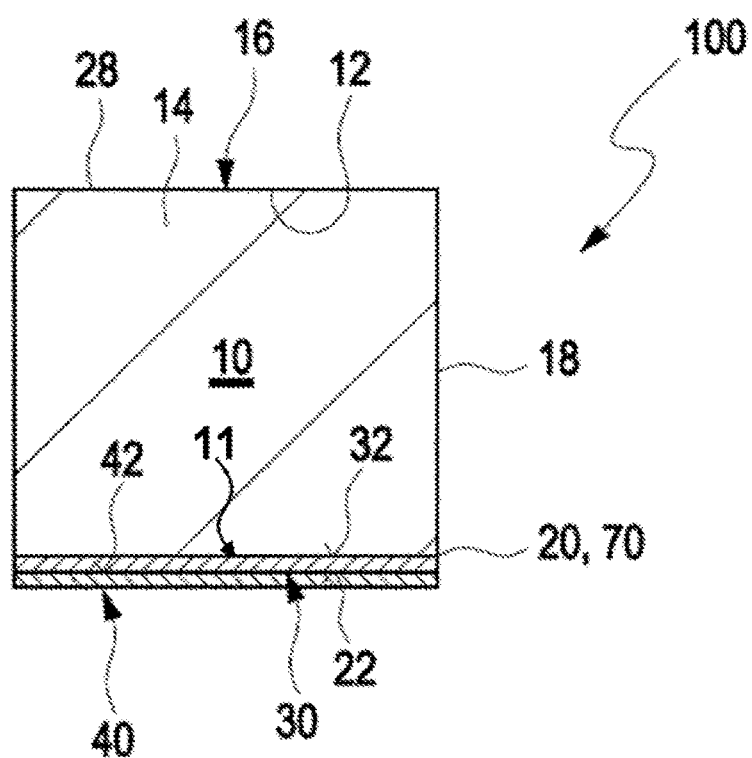
FIG. 12 shows a sectional view of the heat storage device from FIG. 11.

FIG. 11 shows an isometric view of a heat storage device 100 having a flatly extending heat introduction unit 30 and a flatly extending heat discharge unit 40 according to another exemplary embodiment of the invention. In FIG. 12, the heat storage device 100 is shown in a sectional view.

In this exemplary embodiment, the coupling region 42 of the heat discharge unit 40 is arranged on a side 22 of the coupling region 32 of the heat introduction unit 30 facing away from the housing 16. The heat introduction unit 30 is arranged directly on the base plate 20 spaced apart from the storage material 10, while the heat discharge unit 40 is applied to the outer side of the heat introduction unit 30 facing away from the receptacle chamber 12.

Alternatively, the coupling region 32 of the heat introduction unit 30 could also be arranged on a side 22 of the coupling region 42 of the heat discharge unit 40 facing away from the housing 16, so that the heat introduction unit 30 and the heat discharge unit 40 would be exchanged.

FIGS. 13 to 24 show an embodiment of the heat storage device 100 in which the heat introduction unit 30 is arranged in the receptacle chamber 12, while the heat discharge unit 40 is integrated on the base plate 20 of the housing 16 and partially in the base plate 20 of the housing 16. By attaching the heat discharge unit 40 to the base plate 20, the solidification process takes place during the cooling starting from the base plate 20 of the housing 16. In addition, gravity also promotes solidification towards the base plate 20. The heat introduction unit 30 can advantageously be attached within the storage material 10 largely perpendicularly to the heat discharge unit 40. In this way, the formation of material defects on the side of the heat introduction unit 30 facing away from the heat discharge unit 40 can be avoided.

In the exemplary embodiments illustrated in FIGS. 13 to 24, the heat introduction unit 30 can have at least one element 36 having the coupling region 32, in which the coupling region 32 essentially comprises an entire length of the element 36 in the receptacle space 14 and/or an entire circumference of the element 36 and/or an entire circumference of the element 36 in the receptacle space 14.

The coupling region 32 can extend here over at least 50%, in particular over at least 60% of an entire height of the receptacle space 14.

An element 36 or the coupling region 32 of the element 36 can be spaced apart from the housing 16 and in particular one end of the element 36 can be spaced apart from a cover 28 and/or the base of the housing 16. Alternatively, however, the element 36 can also be arranged placed directly on the base plate 20 of the housing.

An element 36 or the coupling region 32 of the element 36 can be oriented in parallel to an element 46 of the heat discharge unit 40.

An element 36 or the coupling region 32 of the element 36 can be oriented in parallel to a vertical axis H or axis of symmetry of the receptacle space 14.

An element 36 or the coupling region 32 of the element 36 can be arranged centrally in the receptacle space 14 and in particular lie on an axis of symmetry of the receptacle space 14.

An element 36 can be arranged inclined, in particular perpendicularly, to an orientation of the heat discharge unit 40, and/or can be arranged in parallel to a direction of gravity S in the intended working state. Furthermore, the element 36 can be arranged in parallel to an orientation of the at least one heat discharge unit 40.

Figure 13:
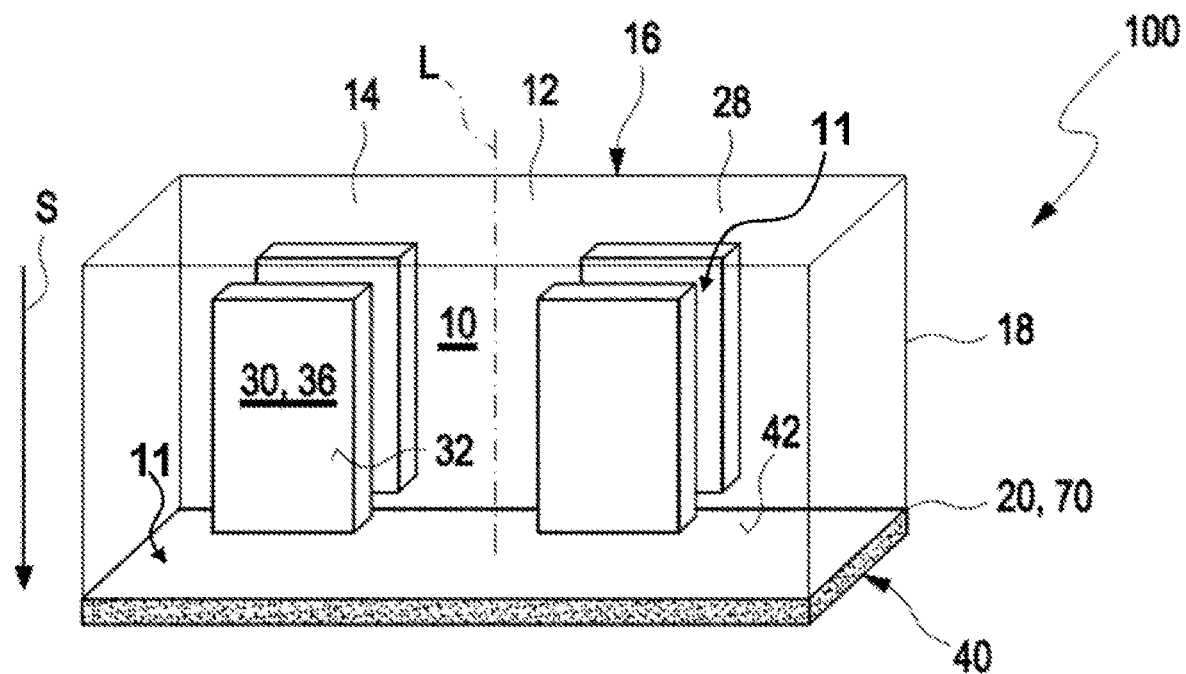
FIG. 13 shows an isometric view of a heat storage device having a flatly extending heat discharge unit in the base plate and a flatly extending heat introduction unit in the receptacle space according to another exemplary embodiment of the invention.
Figure 14:
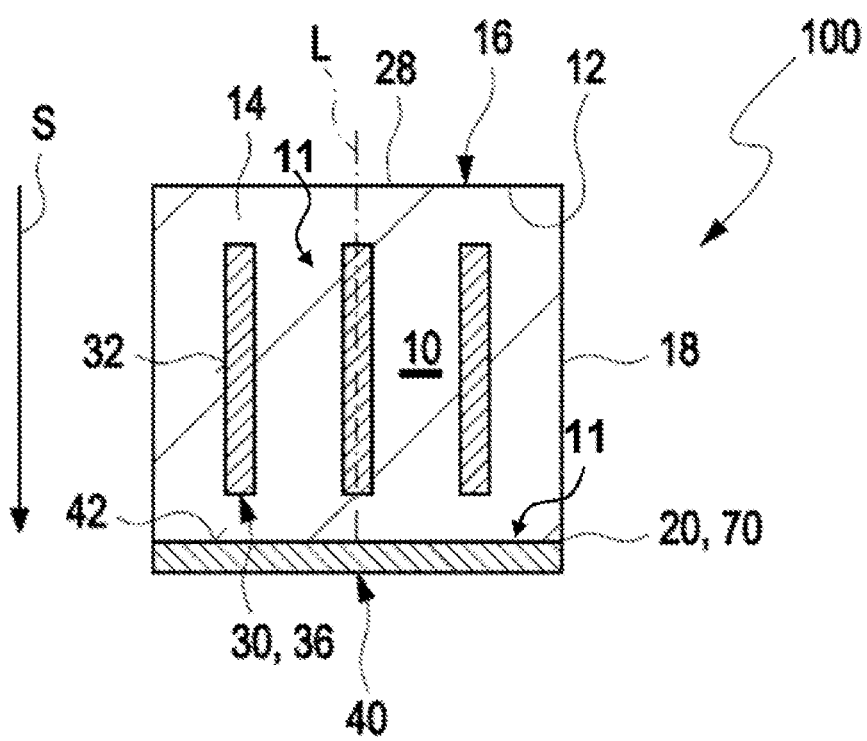
FIG. 14 shows a sectional view of the heat storage device from FIG. 13.

FIG. 13 shows an isometric view of a heat storage device 100 having a flatly extending heat discharge unit 40 in the base plate 20 and a flatly extending heat introduction unit 30 in the receptacle space 14. FIG. 14 shows such a heat storage device 100 in a sectional view. The sectional view comprises more elements 36 than the isometric view.

The heat discharge unit 40 comprises a single element which is integrated in the base plate 20 of the housing 16, while the heat introduction unit 30 comprises multiple elements 36 which are introduced into the storage material 10 in the direction of gravity S perpendicular to the base plate 20 and thus perpendicular to the discharge direction.

As a result, the coupling region 32 of the heat introduction unit 30 is arranged at least in regions within the receptacle space 14, in particular at least in regions within the receptacle chamber 12.

Figure 15:
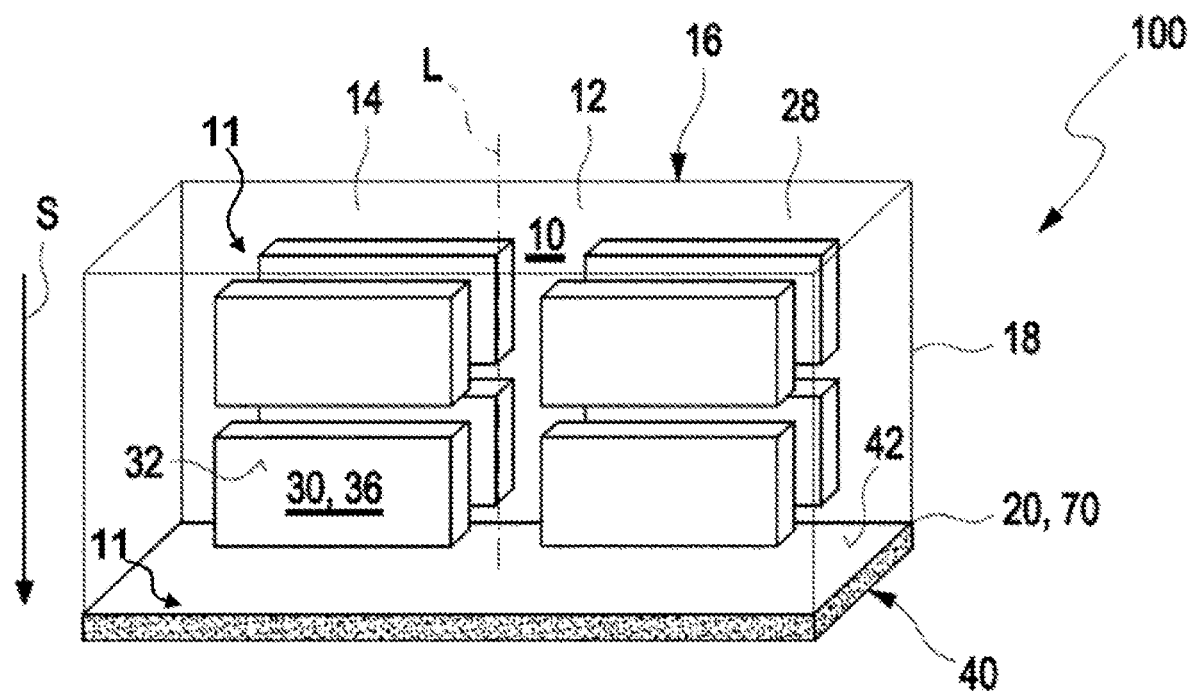
FIG. 15 shows an isometric view of a heat storage device having a flatly extending heat discharge unit in the base plate and a flatly extending heat introduction unit in the receptacle space according to another exemplary embodiment of the invention.
Figure 16:
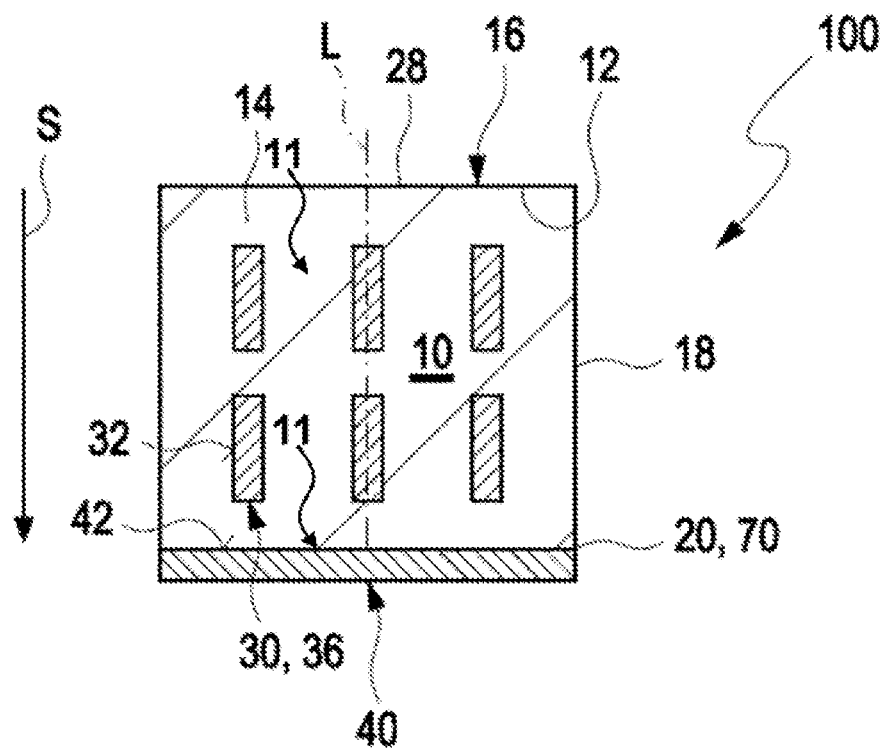
FIG. 16 shows a sectional view of the heat storage device from FIG. 15.

FIG. 15 shows an isometric view of a heat storage device 100 having a flatly extending heat discharge unit 40 in the base plate 20 and a flatly extending heat introduction unit 30 in the receptacle space 14. FIG. 16 shows such a heat storage device in a sectional view. The sectional view comprises more elements 36 than the isometric view.

The arrangement of the heat discharge unit 40 is the same as in the exemplary embodiment in FIGS. 13 and 14. However, the arrangement of the individual elements 36 of the heat discharge unit 30 is horizontal, i.e., parallel to the base plate 20 in the receptacle chamber 12 and thus perpendicular to the discharge direction of the storage material 10.

Figure 17:
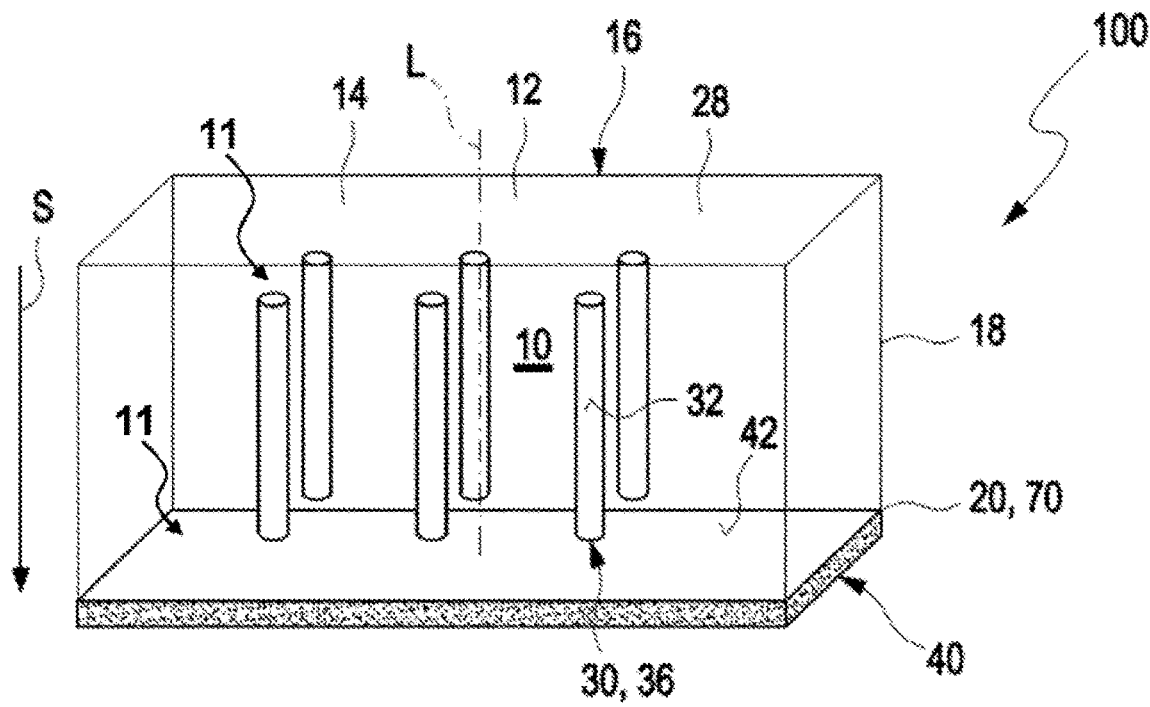
FIG. 17 shows an isometric view of a heat storage device having a flatly extending heat discharge unit in the base plate and a cylindrical heat introduction unit in the receptacle space according to another exemplary embodiment of the invention.
Figure 18:
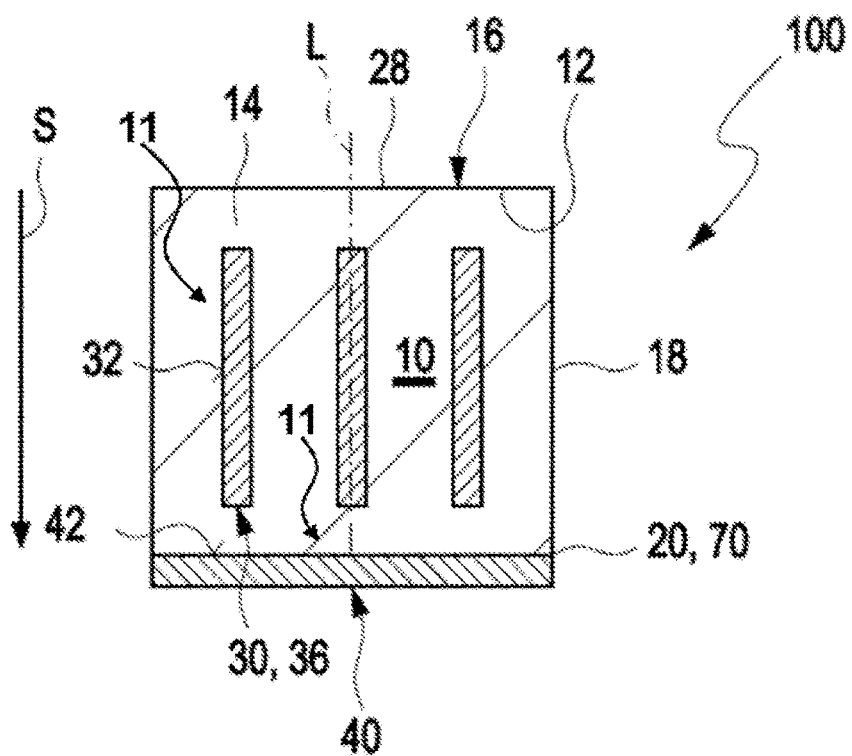
FIG. 18 shows a sectional view of the heat storage device from FIG. 17.

FIG. 17 shows an isometric view of a heat storage device 100 having a flatly extending heat discharge unit 40 in the base plate 20 and a cylindrical heat introduction unit 30 in the receptacle space 14. FIG. 18 shows such a heat storage device 100 in a sectional view. The sectional view comprises more elements 36 than the isometric view.

The arrangement of the heat discharge unit 40 is the same as in the exemplary embodiment in FIGS. 13 and 14. The heat introduction unit 30 comprises multiple elements 36, which are cylindrical and are introduced into the storage material 10 in the direction of gravity S perpendicular to the base plate 20 and thus perpendicular to the discharge direction.

Figure 19:
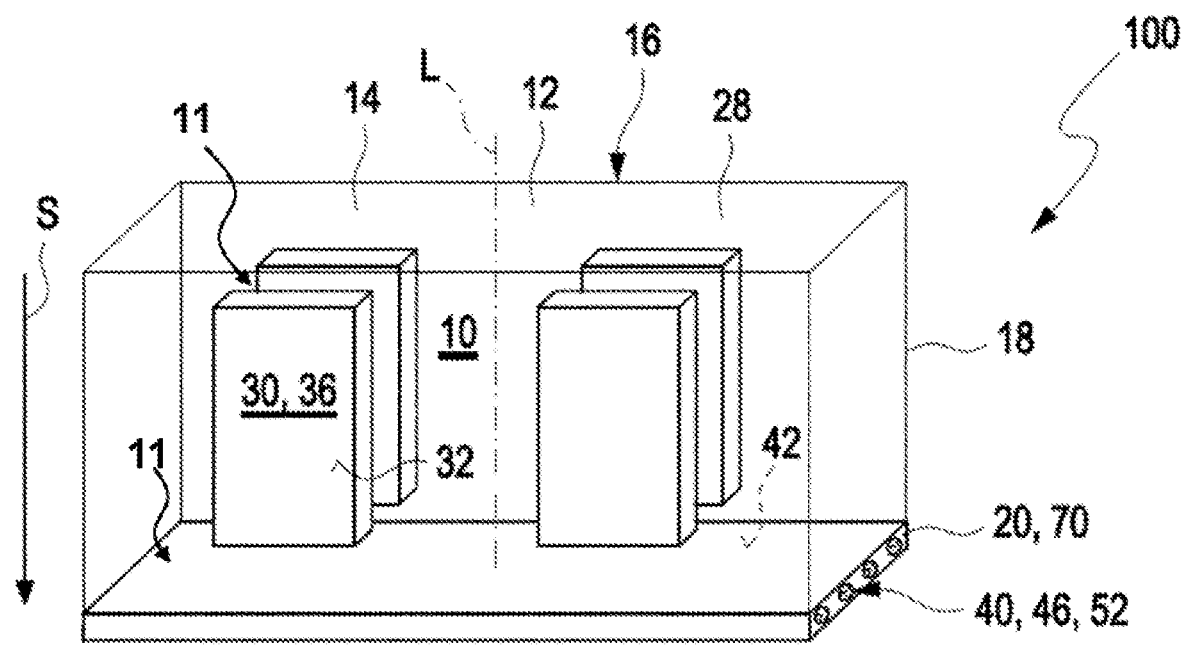
FIG. 19 shows an isometric view of a heat storage device having a cylindrical heat discharge unit in the base plate and a flatly extending heat introduction unit in the receptacle space according to another exemplary embodiment of the invention.
Figure 20:
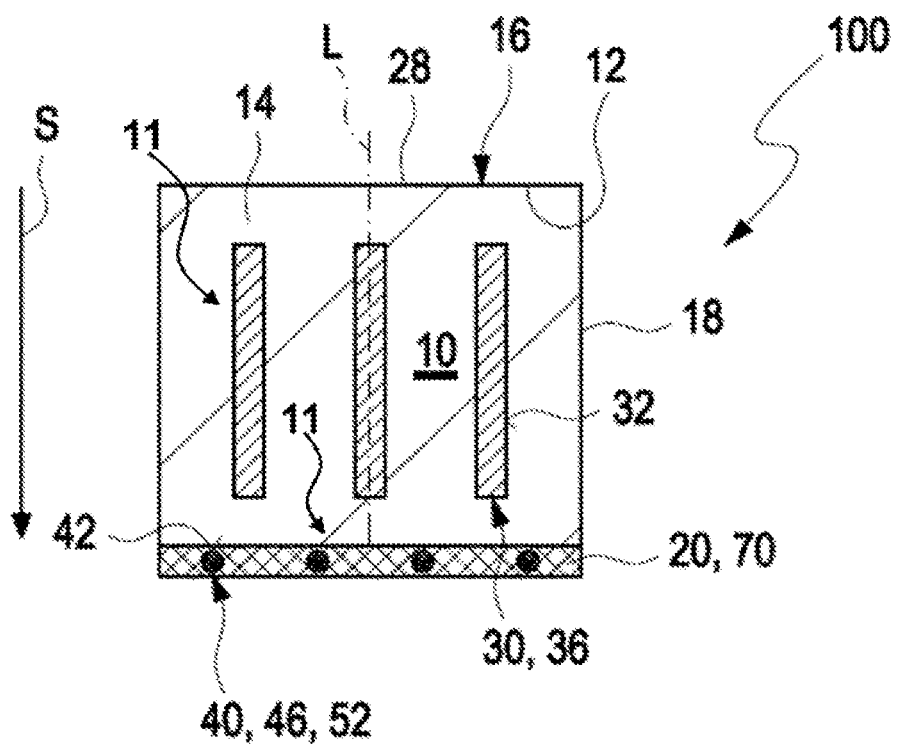
FIG. 20 shows a sectional view of the heat storage device from FIG. 19.

FIG. 19 shows an isometric view of a heat storage device 100 having a cylindrical heat discharge unit 40 in the base plate 20 and a flatly extending heat introduction unit 30 in the receptacle space 14. FIG. 20 shows such a heat storage device 100 in a sectional view. The sectional view comprises more elements 36 than the isometric view.

The individual elements 46 of the heat discharge unit 40 are cylindrical and are inserted horizontally into bores in the base plate 20. The heat introduction unit 30 comprises multiple elements 36 which are introduced in the direction of gravity S into the storage material 10 perpendicularly to the base plate 20 and thus perpendicularly to the discharge direction.

Figure 21:
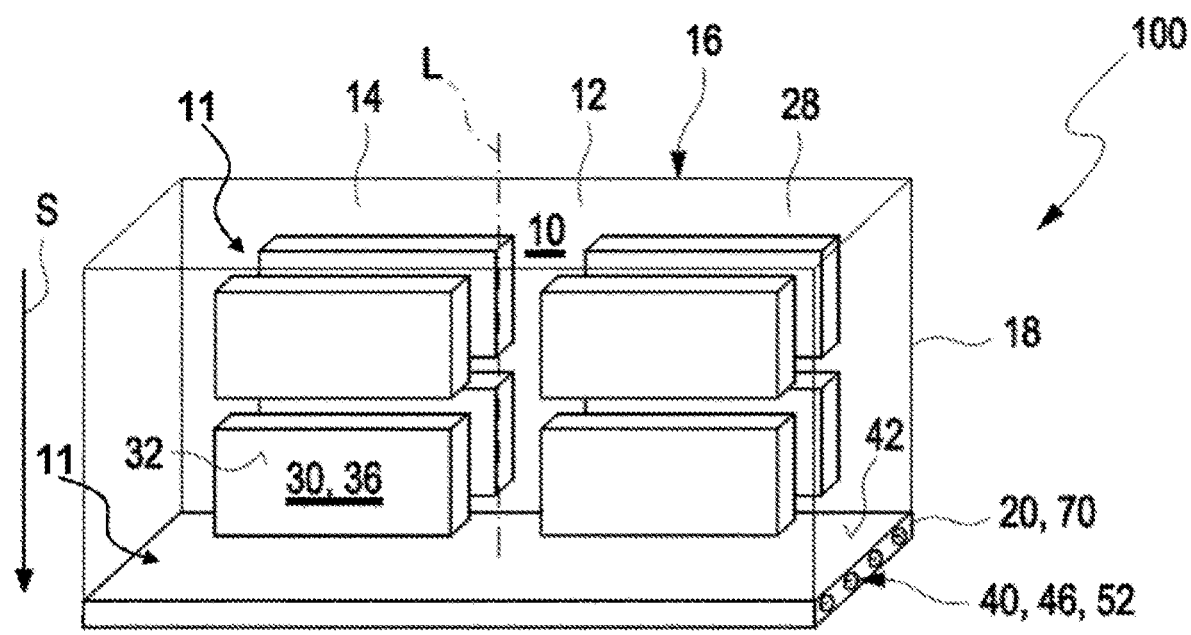
FIG. 21 shows an isometric view of a heat storage device having a cylindrical heat discharge unit in the base plate and a flatly extending heat introduction unit in the receptacle space according to another exemplary embodiment of the invention.
Figure 22:
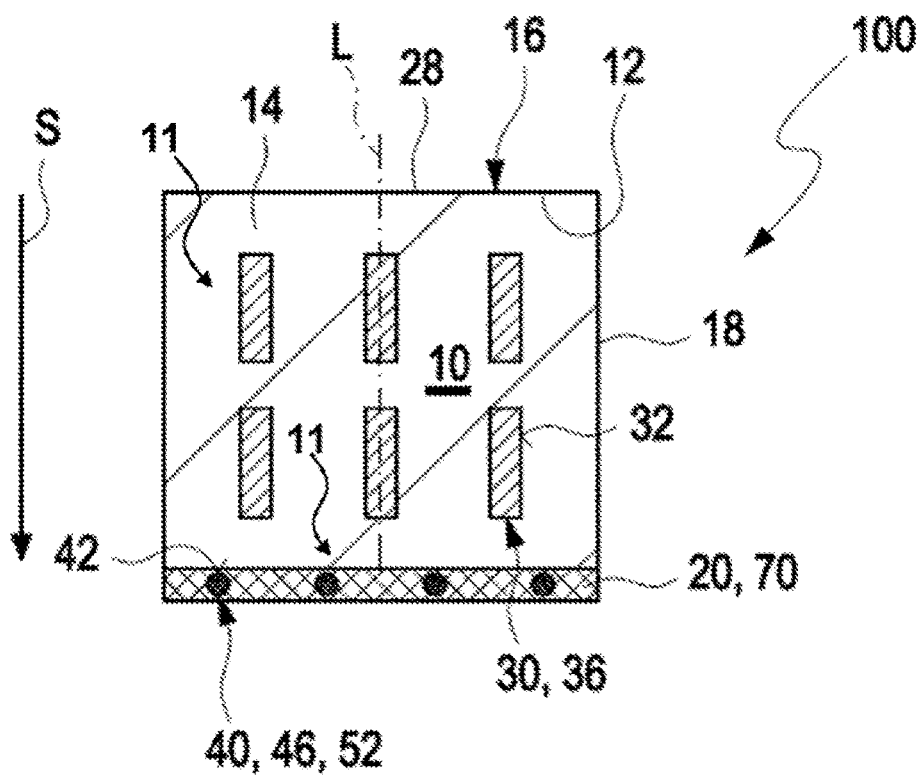
FIG. 22 shows a sectional view of the heat storage device from FIG. 21.

FIG. 21 shows an isometric view of a heat storage device 100 having a cylindrical heat discharge unit 40 in the base plate 20 and a flatly extending heat introduction unit 30 in the receptacle space 14. FIG. 22 shows such a heat storage device 100 in a sectional view. The sectional view comprises more elements 36 than the isometric view.

The arrangement of the heat discharge unit 40 is the same as in the exemplary embodiment in FIGS. 19 and 20. However, the arrangement of the individual elements 36 of the heat discharge unit 30 is horizontal, i.e., parallel to the base plate 20 in the receptacle chamber 12 and thus perpendicular to the discharge direction of the storage material 10.

Figure 23:
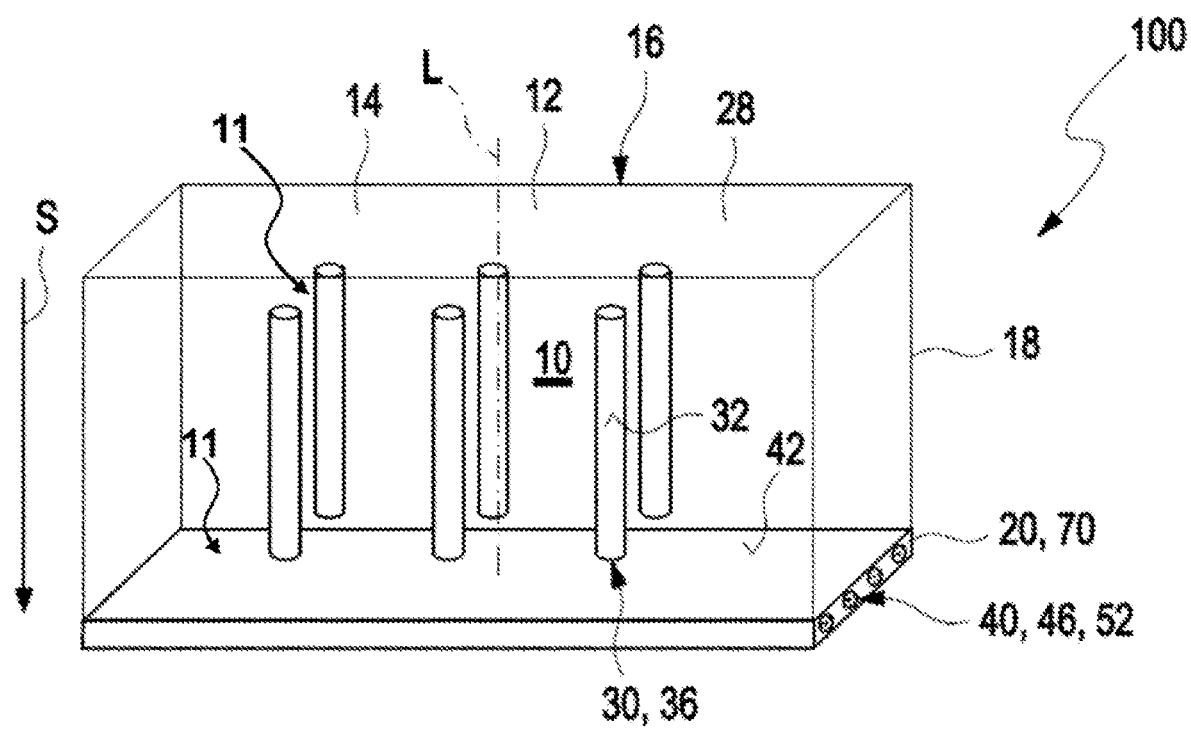
FIG. 23 shows an isometric view of a heat storage device having a cylindrical heat discharge unit in the base plate and a flatly extending heat introduction unit in the receptacle space according to another exemplary embodiment of the invention.
Figure 24:
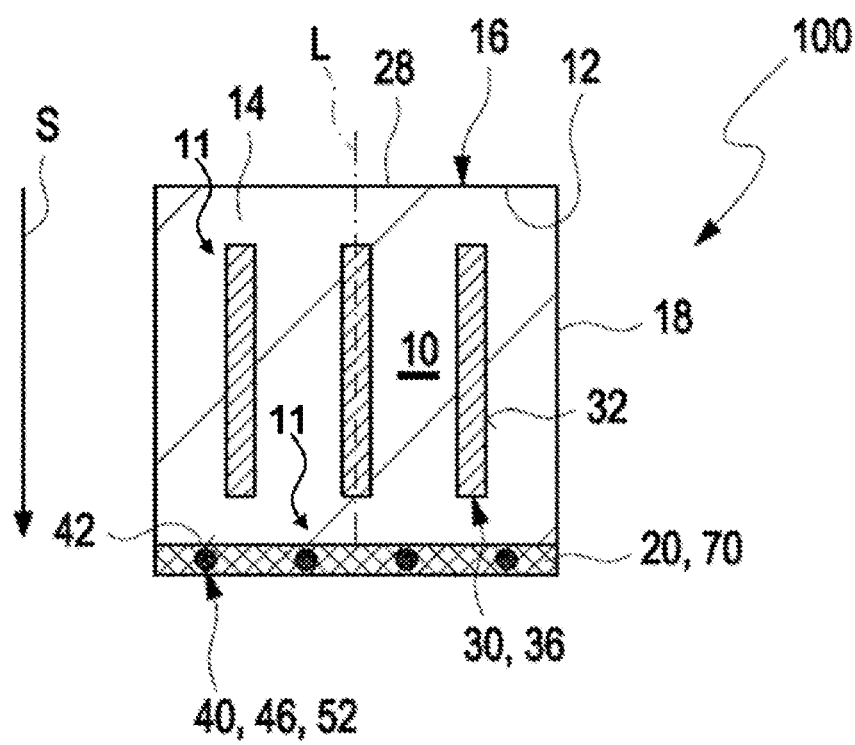
FIG. 24 shows a sectional view of the heat storage device from FIG. 23.

FIG. 23 shows an isometric view of a heat storage device 100 having a cylindrical heat discharge unit 40 in the base plate 20 and a flatly extending heat introduction unit 30 in the receptacle space 14. FIG. 24 shows such a heat storage device 100 in a sectional view. The sectional view comprises more elements 36 than the isometric view.

The arrangement of the heat discharge unit 40 is the same as in the exemplary embodiment in FIGS. 19 and 20. The heat introduction unit 30 comprises multiple elements 36, which are cylindrical and are introduced into the storage material 10 in the direction of gravity S perpendicular to the base plate 20 and thus perpendicular to the discharge direction.

FIGS. 25 to 32 show an embodiment of the heat storage device 100 in which the heat discharge unit 40 is arranged in the receptacle chamber 12, while the heat introduction unit 30 is integrated on the base plate 20 of the housing 16 and partially in the base plate 20 of the housing 16.

By attaching the heat discharge unit 40 in the storage material 10, the solidification process takes place starting from this unit. The direction of gravity promotes contact toward the base plate 20.

In the exemplary embodiments illustrated in FIGS. 25 to 32, the heat discharge unit 40 can have at least one element 46 having the coupling region 42, in which the coupling region 42 essentially comprises an entire length of the element 46 in the receptacle space 14 and/or an entire circumference of the element 46 and/or an entire circumference of the element 46 in the receptacle space 14.

The coupling region 42 can extend here over at least 50%, in particular over at least 60% of an entire height of the receptacle space 14.

An element 46 or the coupling region 42 of the element 46 can be spaced apart from the housing 16. In particular, one end of the element 46 can be spaced apart from a cover 28 and/or the base of the housing 16.

An element 46 or the coupling region 42 of the element 46 can be oriented in parallel to an element 36 of the heat introduction unit 30.

An element 46 or the coupling region 42 of the element 46 can be oriented in parallel to a vertical axis L or axis of symmetry of the receptacle space 14.

An element 46 or the coupling region 42 of the element 46 can be arranged centrally in the receptacle space 14 and in particular lie on an axis of symmetry of the receptacle space 14.

The at least one element 46 can be cylindrical and in particular can be formed as a pipe 52.

The at least one element 46 can be arranged centrally in the receptacle space 14 and in particular can be arranged along an axis of symmetry of the receptacle space 14.

Figure 25:
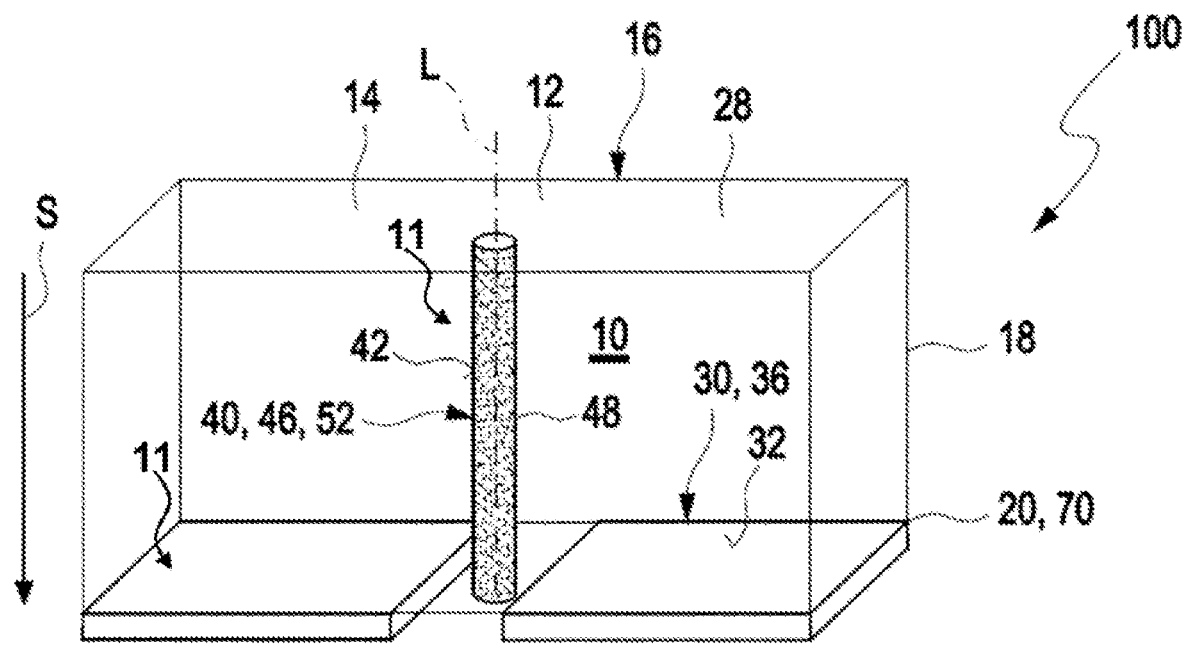
FIG. 25 shows an isometric view of a heat storage device having a flatly extending heat introduction unit in the base plate and a cylindrical heat discharge unit in the receptacle space according to another exemplary embodiment of the invention.
Figure 26:
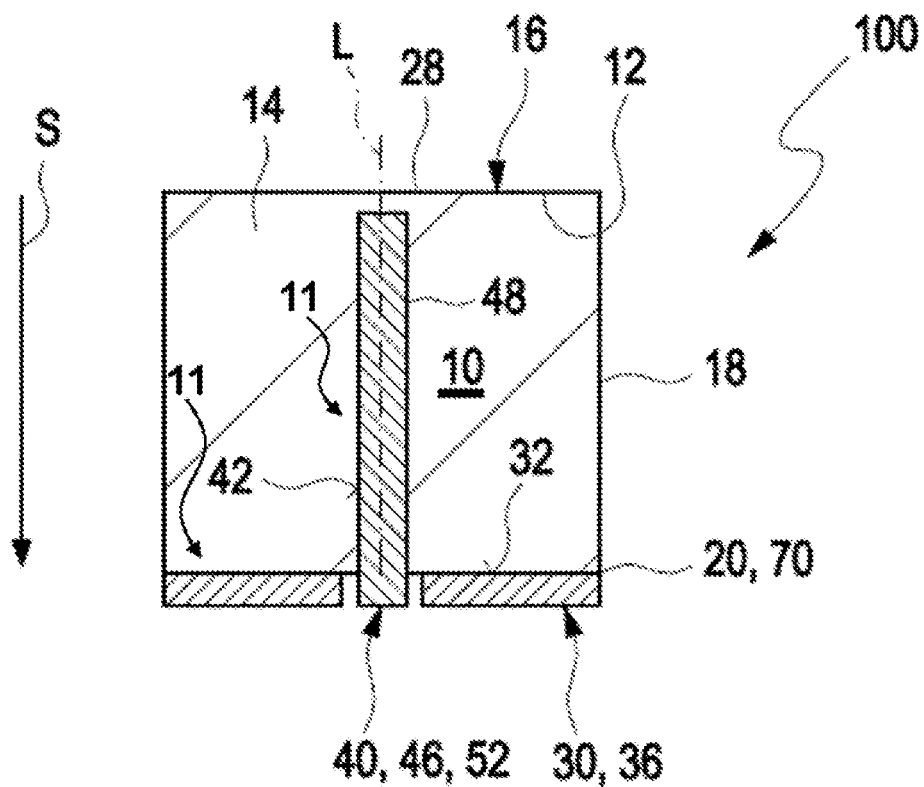
FIG. 26 shows a sectional view of the heat storage device from FIG. 25.

FIG. 25 shows an isometric view of a heat storage device 100 having a flatly extending heat introduction unit 30 in the base plate 20 and a cylindrical heat discharge unit 40 in the receptacle space 14. FIG. 26 shows such a heat storage device 100 in a sectional view.

The flatly extending heat introduction unit 30 is implemented having two elements 36. The heat discharge unit 40 implemented cylindrically as a pipe 52 is arranged perpendicularly in the direction of gravity S having at least one region 48 in the storage material 10. Sections 38 of the heat introduction unit 30 are arranged on both sides of the heat discharge unit 40. The heat discharge unit 40 can, for example, be introduced into the housing 16 from below through the base plate 20.

As a result, the coupling region 42 of the heat discharge unit 40 is arranged at least in regions within the receptacle space 14, in particular at least in regions within the receptacle chamber 12.

Figure 27:
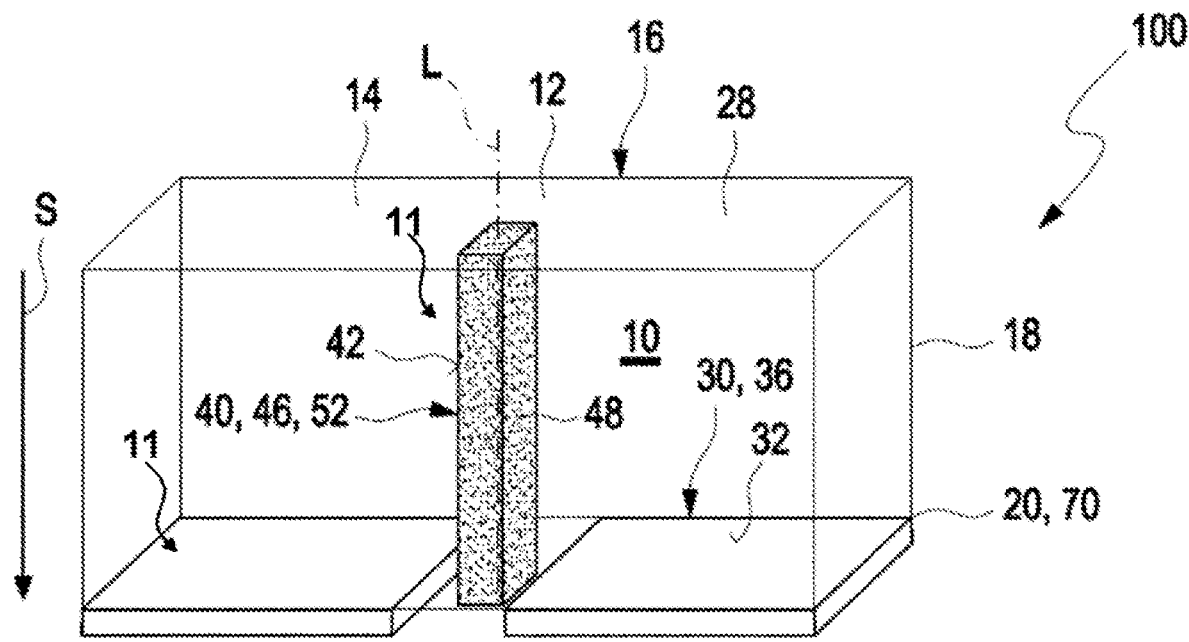
FIG. 27 shows an isometric view of a heat storage device having a flatly extending heat introduction unit in the base plate and a cuboid heat discharge unit in the receptacle space according to another exemplary embodiment of the invention.
Figure 28:
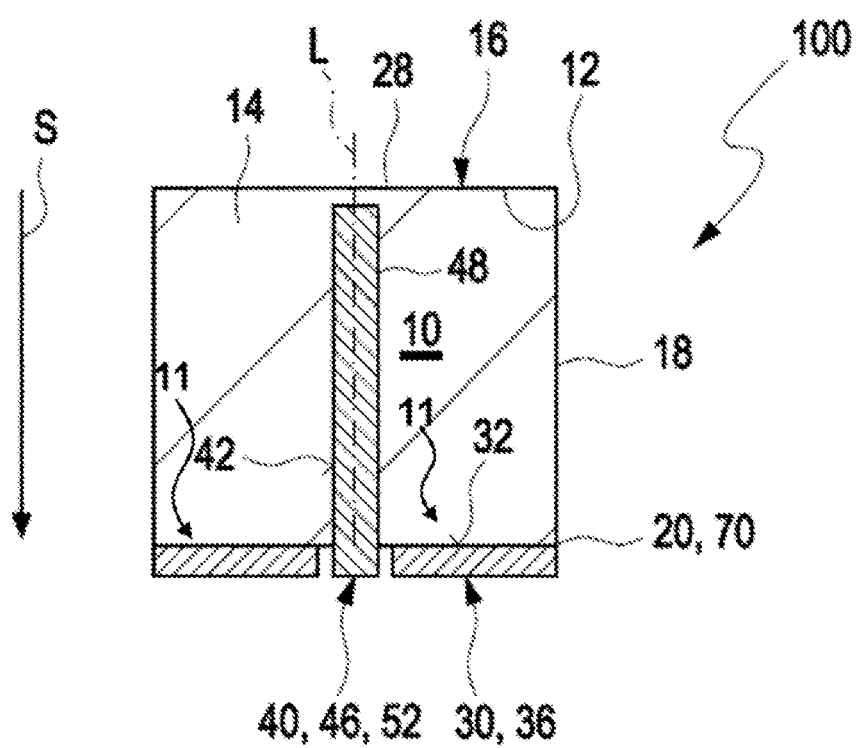
FIG. 28 shows a sectional view of the heat storage device from FIG. 27.

FIG. 27 shows an isometric view of a heat storage device 100 having a flatly extending heat introduction unit 30 in the base plate 20 and a cuboid heat discharge unit 40 in the receptacle space 14. FIG. 28 shows such a heat storage device 100 in a sectional view.

The arrangement of the heat introduction unit 30 is the same as in the exemplary embodiment in FIGS. 25 and 26. The cuboid heat discharge unit 40 is arranged perpendicularly in the direction of gravity S having at least one region 48 in the storage material 10. Sections 38 of the heat introduction unit 30 are arranged on both sides of the heat discharge unit 40. The heat discharge unit 40 can, for example, be introduced into the housing 16, and thus into the storage material 10, from below through the base plate 20.

In the exemplary embodiments illustrated in FIGS. 25 to 28, the heat introduction unit 30 in the receptacle space 14 can surround the heat discharge unit 34 at least with one section 38, in particular surround it concentrically and/or in a closed manner.

Furthermore, the heat introduction unit 30 can be in thermal contact and/or mechanical contact with the heat discharge unit 40 in the receptacle space 14, which can also be the case with the embodiments shown in the other figures.

Figure 29:
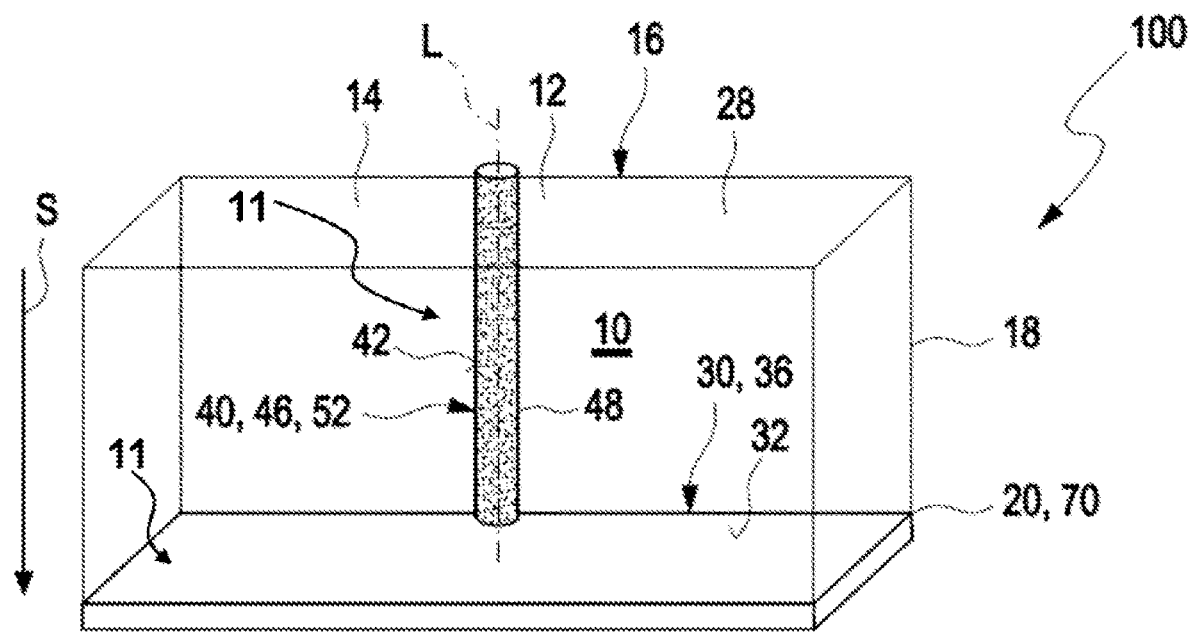
FIG. 29 shows an isometric view of a heat storage device having a flatly extending heat introduction unit in the base plate and a cylindrical heat discharge unit in the receptacle space according to another exemplary embodiment of the invention.
Figure 30:
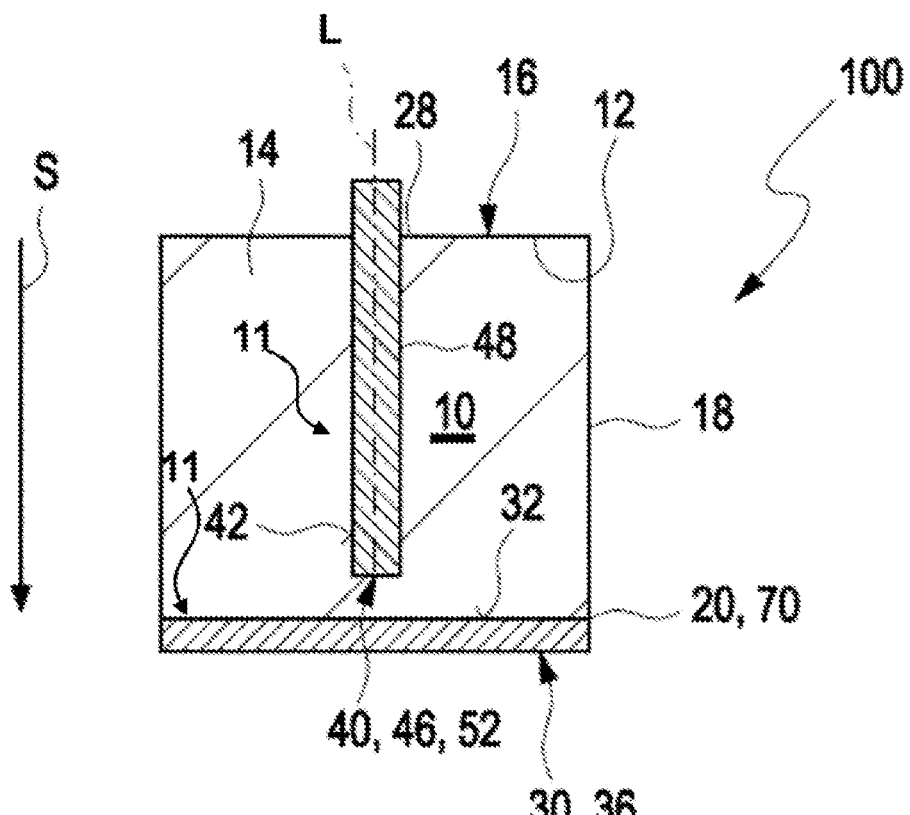
FIG. 30 shows a sectional view of the heat storage device from FIG. 29.

FIG. 29 shows an isometric view of a heat storage device 100 having a flatly extending heat introduction unit 30 in the base plate 20 and a cylindrical heat discharge unit 40 in the receptacle space 14. FIG. 30 shows such a heat storage device 100 in a sectional view.

The heat introduction unit 30 comprises a single element which is integrated into the base plate 20 of the housing 16. The heat discharge unit 40 is cylindrical and is implemented as a single pipe 52. The heat discharge unit 40 is introduced, for example, from above into the housing 16 and thus into the storage material 10.

Figure 31:
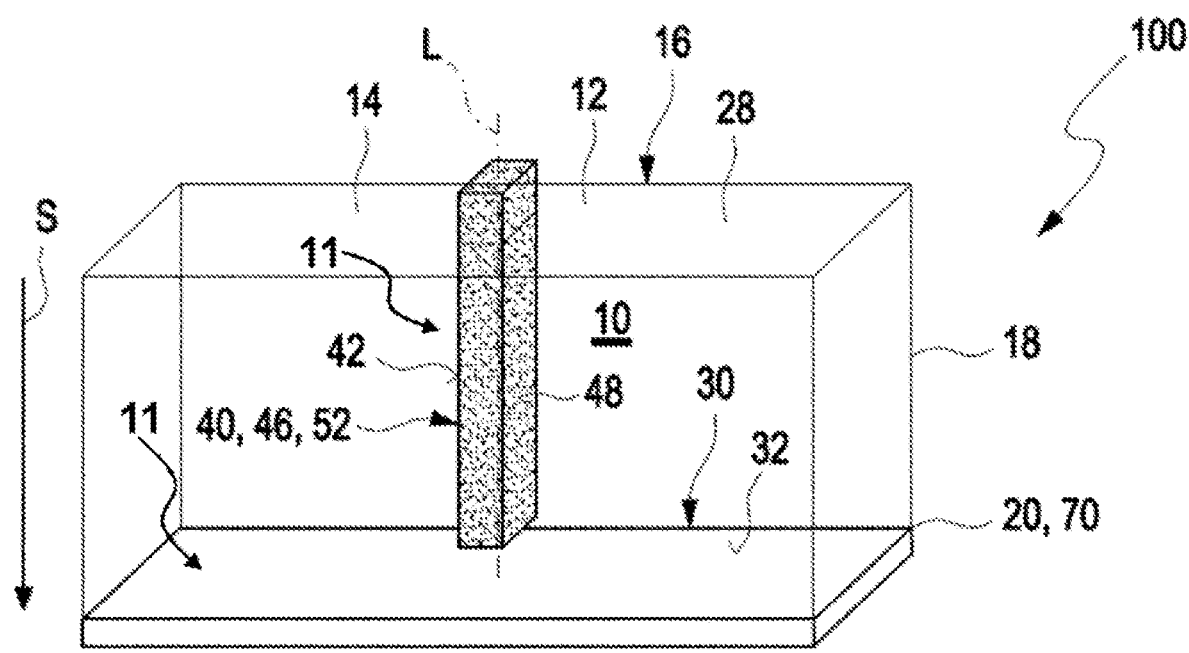
FIG. 31 shows an isometric view of a heat storage device having a flatly extending heat introduction unit in the base plate and a cuboid heat discharge unit in the receptacle space according to another exemplary embodiment of the invention.
Figure 32:
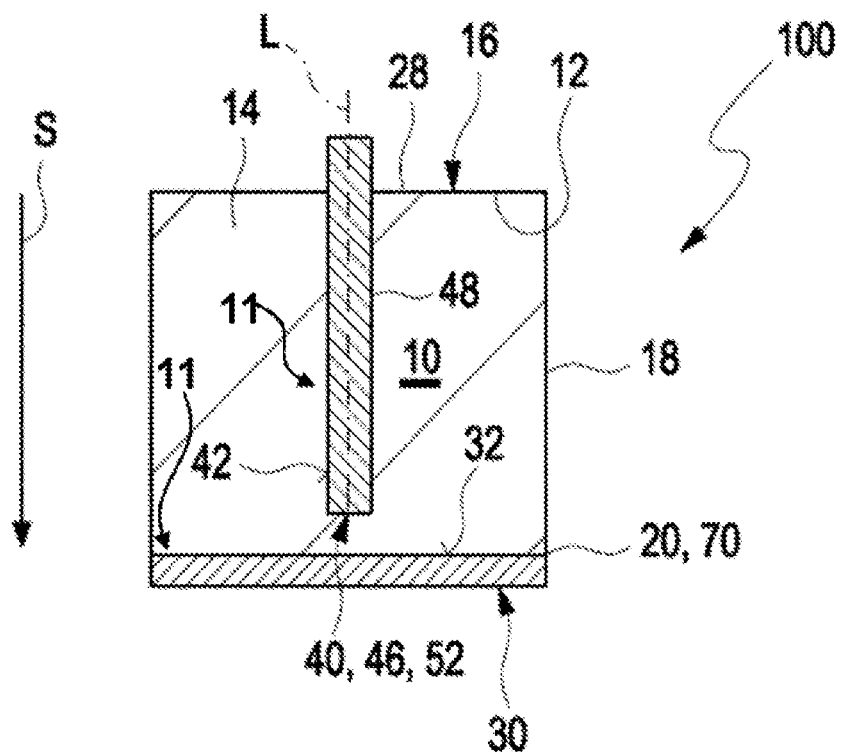
FIG. 32 shows a sectional view of the heat storage device from FIG. 31.

FIG. 31 shows an isometric view of a heat storage device 100 having a flatly extending heat introduction unit 30 in the base plate 20 and a cuboid heat discharge unit 40 in the receptacle space 14. FIG. 32 shows such a heat storage device 100 in a sectional view.

The arrangement of the heat introduction unit 30 is the same as in the exemplary embodiment in FIGS. 29 and 30. The heat discharge unit 40 is cuboid and implemented as a single element. The heat discharge unit 40 is introduced, for example, from above into the housing 16 and thus into the storage material 10.

In the exemplary embodiments shown in FIGS. 13 to 32, the heat introduction unit 30 is at least partially spaced apart in the receptacle space 14 from the heat discharge unit 40, wherein storage material 10 is arranged between the heat introduction unit 30 and the heat discharge unit 40.

Alternatively, the heat introduction unit 30 or the heat discharge unit 40 can each be formed adjacent to the base plate 20.

Figure 33:
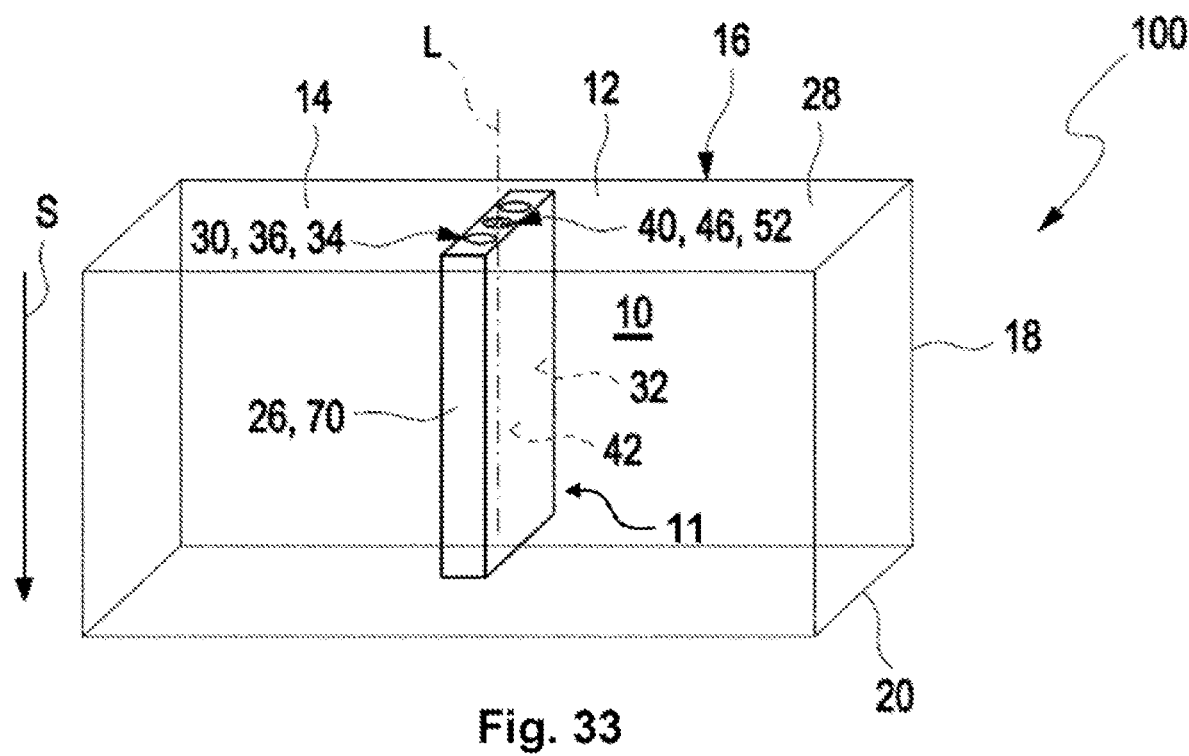
FIG. 33 shows an isometric view of a heat storage device having a cylindrical heat introduction unit and a cylindrical heat discharge unit in an enclosure in the receptacle space according to another exemplary embodiment of the invention.
Figure 34A:
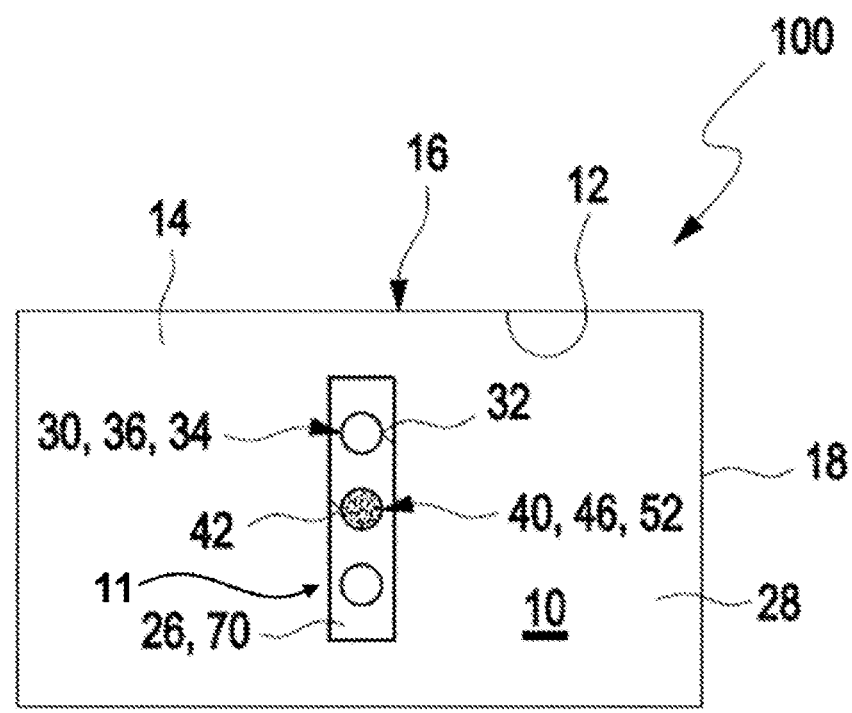
FIG. 34 shows a top view of heat storage device having a linearly arranged heat introduction unit and heat discharge unit in an enclosure according to another exemplary embodiment of the invention.
Figure 34:
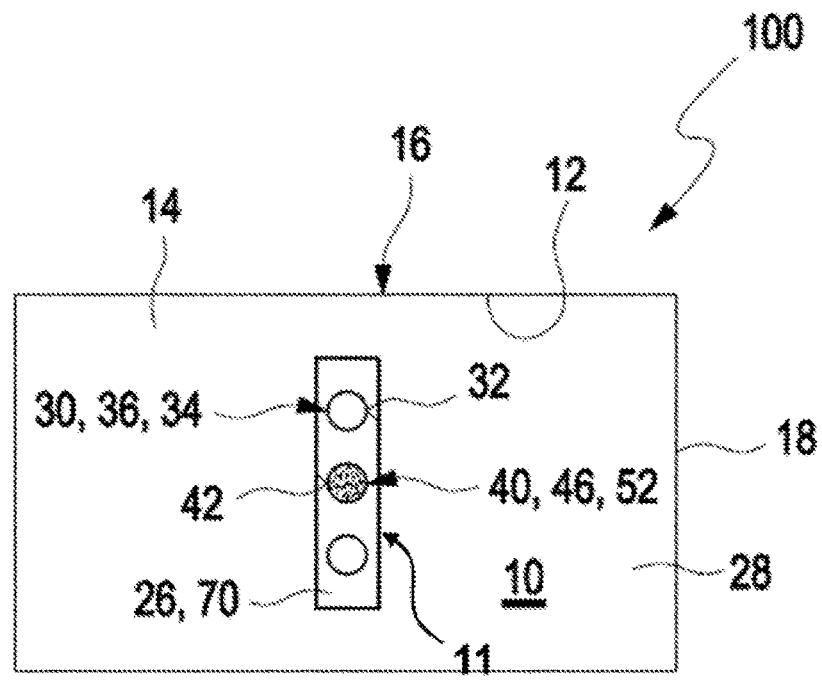

FIG. 33 shows an isometric view of a heat storage device 100 having a cylindrical heat introduction unit 30 and a cylindrical heat discharge unit 40 in an enclosure 26 in the receptacle space 14. FIG. 34 shows a top view of the heat storage device 100 having a linearly arranged heat introduction unit 30 and heat discharge unit 40 in the enclosure 26.

Further exemplary embodiments of such an arrangement are shown in FIGS. 35 to 39.

In the embodiment shown in FIGS. 33 to 39, the heat introduction unit 30 and the heat discharge unit 40 are not introduced directly into the storage material 10, but rather into an enclosure 26 as a thermal bridge element 70, which in turn is introduced into the storage material 10.

As a result, the heat introduction unit 30 and the heat discharge unit 40 themselves do not have to be embodied as material-compatible with the storage material 10. Only the enclosure 26 has to have material compatibility with the storage material 10. Due to the introduction of the heat introduction unit 30 and the heat discharge unit 40 into the same enclosure 26, the storage material can preferably solidify around the enclosure 26. This ensures good thermal contact with the storage material 10 for both the heat introduction unit 30 and the heat discharge unit 40.

The coupling region 32, 42 of the heat introduction unit 30 and the heat discharge unit 40 is arranged in the enclosure 26 in these exemplary embodiments. The enclosure 26, which is used as a thermal bridge element 70, is in turn arranged at least in regions within the receptacle chamber 12 and the receptacle space 14.

An element 36 of the heat introduction unit 30 can be arranged centrally in the enclosure 26, for example, and a plurality of elements 46, in particular pipes 52, of the heat discharge unit 40 can be positioned spaced apart from this element 36. In particular, the elements 46 of the heat discharge unit 40 can be arranged mirror symmetrically or rotationally symmetrically to the element 36 of the heat introduction unit 30. Alternatively, an element 46 of the heat discharge unit 40 can also be arranged centrally, which can be enclosed spaced apart from elements 36 of the heat introduction unit 30.

In the exemplary embodiment illustrated in FIGS. 33 and 34, a central element 46, in particular a central pipe 52, of the heat discharge unit 40 is arranged in the enclosure 26. Two cylindrical elements 36 of the heat introduction unit 30 are arranged spaced apart from the element 46. The elements 36 of the heat introduction unit 30 are arranged mirror-symmetrically to the element 46 in a row. Elements 36 and 46 are all oriented in parallel to one another.

Figure 35:
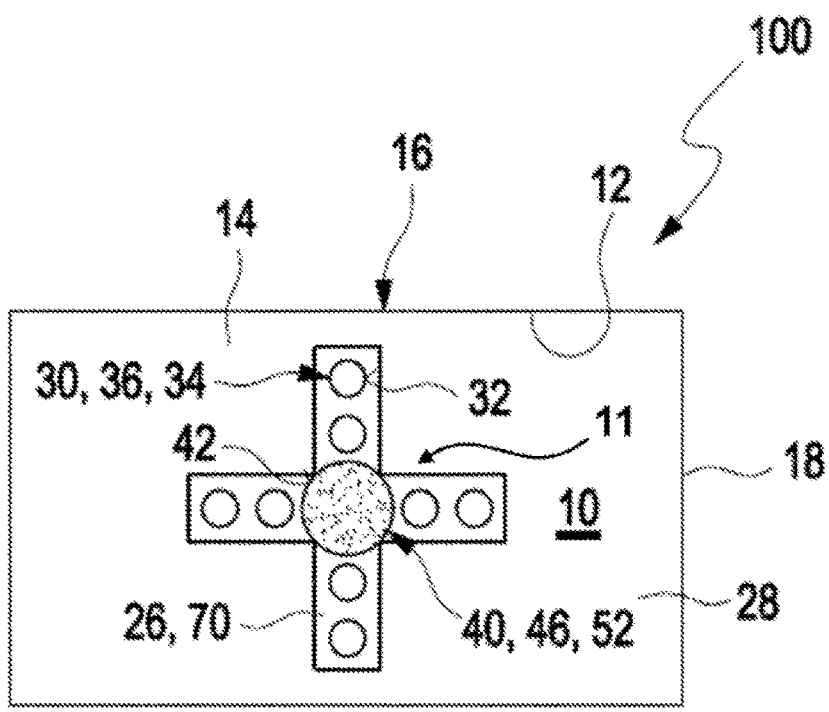
FIG. 35 shows a top view of a heat storage device having a heat introduction unit and a heat discharge unit arranged in a cross shape in an enclosure according to another exemplary embodiment of the invention.

FIG. 35 shows a top view of the heat storage device 100 with a heat introduction unit 30 and a central heat discharge unit 40 arranged in the shape of a cross in an enclosure 26. Two cylindrical elements 36 of the heat introduction unit 30 are arranged in each case as arms of a cross with the individual cylindrical element 46 of the heat discharge unit 40 at the crossing point. Elements 36 and 46 are all oriented in parallel to one another.

Figure 36:
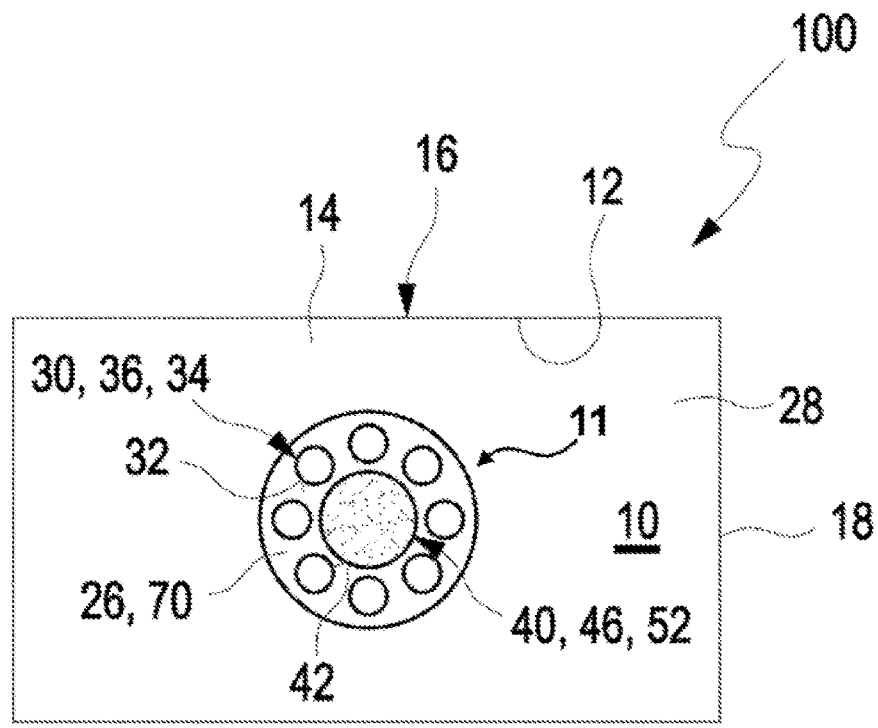
FIG. 36 shows a top view of a heat storage device having a coaxially arranged heat introduction unit and heat discharge unit in an enclosure according to another exemplary embodiment of the invention.

FIG. 36 shows a top view of a heat storage device 100 having a coaxially arranged heat introduction unit 30 and a heat discharge unit 40 in an enclosure 26. The heat introduction unit 30 has a centrally arranged cylindrical element 36 which is surrounded in a circle by cylindrical elements 46 of the heat discharge unit 40. Elements 36 and 46 are all oriented in parallel to one another.

Figure 37:
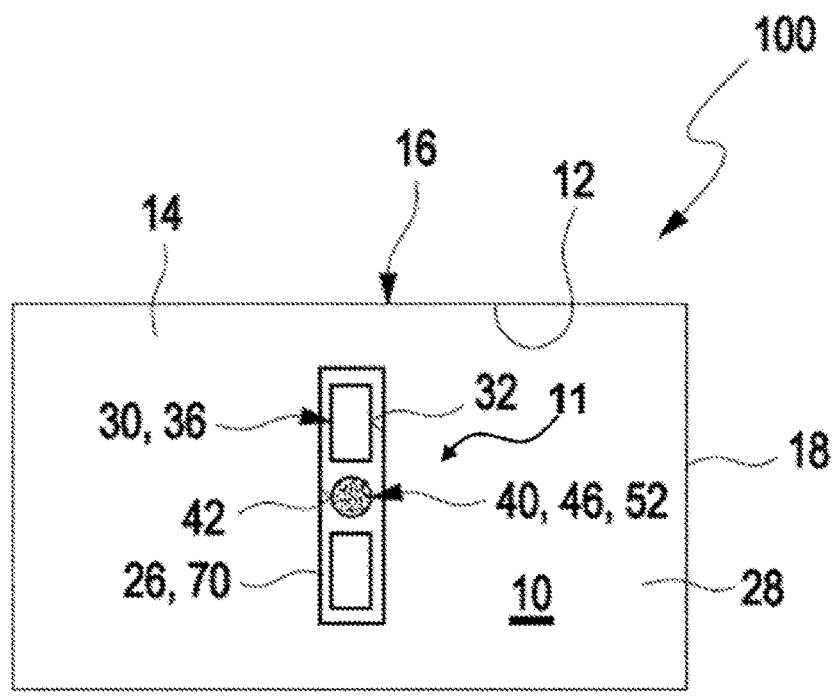
FIG. 37 shows a top view of a heat storage device having a linearly arranged heat introduction unit and heat discharge unit in an enclosure according to another exemplary embodiment of the invention.

FIG. 37 shows a top view of a heat storage device 100 having a linearly arranged heat introduction unit 30 and heat discharge unit 40 in an enclosure 26.

An element 46 of the heat discharge unit 40 is arranged centrally in the enclosure 26 and is separated from two planar elements 36 of the heat introduction unit 30, which are arranged in a row, standing vertically, in parallel to the element 46.

Figure 38:
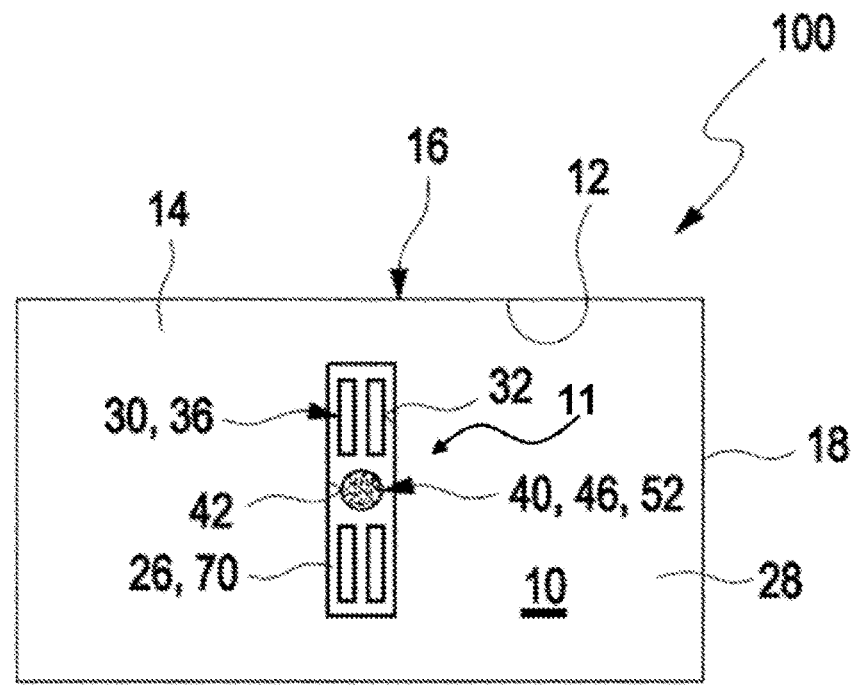
FIG. 38 shows a top view of a heat storage device having a linearly arranged heat introduction unit and heat discharge unit in an enclosure according to another exemplary embodiment of the invention.

FIG. 38 shows a top view of a heat storage device 100 having a linearly arranged heat introduction unit 30 and heat discharge unit 40 in a housing 26. The exemplary embodiment illustrated in FIG. 38 is designed similarly to the exemplary embodiment illustrated in FIG. 37. In FIG. 38, only two elements 36 of the heat introduction unit 30 are shown in parallel to one another in each case on both sides of the element 46 of the heat discharge unit 40.

Figure 39:
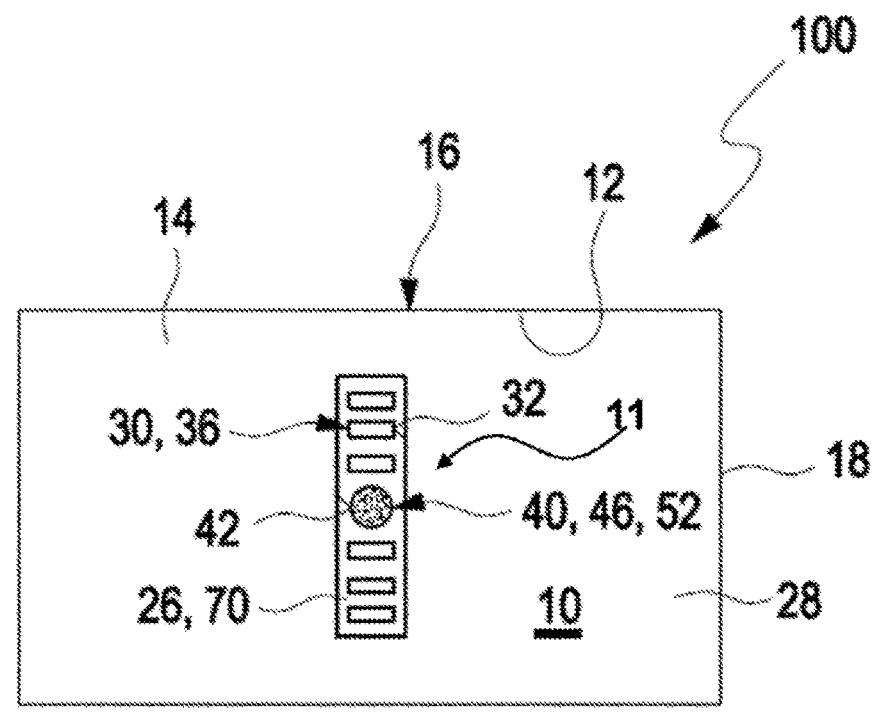
FIG. 39 shows a top view of a heat storage device having a linearly arranged heat introduction unit and heat discharge unit in an enclosure according to another exemplary embodiment of the invention.

FIG. 39 shows a top view of a heat storage device 100 having a linearly arranged heat introduction unit 30 and heat discharge unit 40 in an enclosure 26. In this exemplary embodiment, three rod-shaped elements 36 of the heat introduction unit 30 are arranged in a row in parallel to one another opposite to a central cylindrical element 46 of the heat discharge unit 40.

The invention claimed is:

1. A heat storage device, having a metallic phase change material as a storage material, comprising at least one receptacle chamber having a receptacle space for the storage material and a housing for the receptacle space, at least one heat introduction unit for introducing heat into the at least one receptacle chamber, and at least one heat discharge unit for discharging heat from the at least one receptacle chamber,
   wherein
   a coupling region of the heat introduction unit provided for thermal coupling with the storage material and/or a coupling region of the heat discharge unit provided for thermal coupling with the storage material is arranged spaced apart at least in regions from the storage material, and
   wherein an arrangement of the heat introduction unit and the heat discharge unit to ensure thermal contact between the heat introduction unit and the storage material and between the heat discharge unit and the storage material is selected so that when the heat storage device is used as intended, cavities and/or pores form remotely from heat introduction unit and heat discharge unit in the regions of the storage material solidifying last.

2. A heat storage device, having a metallic phase change material as a storage material, comprising at least one receptacle chamber having a receptacle space for the storage material and a housing for the receptacle space, at least one heat introduction unit for introducing heat into the at least one receptacle chamber, and at least one heat discharge unit for discharging heat from the at least one receptacle chamber,
   wherein a coupling region of the heat introduction unit provided for thermal coupling with the storage material and/or a coupling region of the heat discharge unit provided for thermal coupling with the storage material is arranged spaced apart at least in regions from the storage material, wherein an arrangement of the heat introduction unit and the heat discharge unit, to ensure thermal contact between the heat introduction unit and the storage material and between the heat discharge unit and the storage material, is selected depending on the solidification of the storage material starting from the heat discharge unit in conjunction with an associated reduction in volume and the resulting effects due to different coefficients of thermal expansion of components used in the storage material, and wherein furthermore the arrangement of the heat introduction unit and the heat discharge unit to ensure thermal contact is selected depending on an influence of installations in the storage material on an effective thermal conductivity within the storage material and an associated influence on the solidification of the storage material.

3. The heat storage device as claimed in claim 2, wherein an arrangement of the heat introduction unit and the heat discharge unit to ensure thermal contact between the heat introduction unit and the storage material and between the heat discharge unit and the storage material is selected so that when the heat storage device is used as intended, cavities and/or pores form remotely from heat introduction unit and heat discharge unit in the regions of the storage material solidifying last.

4. The heat storage device as claimed in claim 1, wherein the coupling region of the heat introduction unit and the coupling region of the heat discharge unit are arranged outside the receptacle space on a base of the housing, wherein the coupling region of the heat introduction unit and/or the heat discharge unit is thermally coupled to the storage material via at least one thermal bridge element, wherein the housing has the at least one thermal bridge element.

5. The heat storage device as claimed in claim 1, wherein the coupling region of the heat introduction unit is arranged outside the receptacle space on a base of the housing and the coupling region of the heat discharge device is arranged at least in regions within the receptacle, or wherein the coupling region of the heat discharge unit is arranged outside the receptacle space on a base of the housing and the coupling region of the heat introduction unit is arranged at least in regions within the receptacle space, wherein the coupling region of the heat introduction unit and/or the heat discharge unit is thermally coupled to the storage material via at least one thermal bridge element.

6. The heat storage device as claimed in claim 5, wherein the at least one thermal bridge element is arranged in the receptacle space, and/or wherein the housing has the at least one thermal bridge element.

7. The heat storage device as claimed in claim 1, wherein the coupling region of the heat introduction unit and the coupling region of the heat discharge unit are arranged at least in regions within the receptacle space, wherein the coupling region of the heat introduction unit and/or the heat discharge unit is thermally coupled to the storage material via at least one thermal bridge element, wherein the at least one thermal bridge element is arranged in the receptacle space.

8. The heat storage device as claimed in claim 1, wherein the coupling region of the heat introduction unit is arranged on a side (22) of the coupling region of the heat discharge unit facing away from the housing or wherein the coupling region of the heat discharge unit is arranged on a side (22) of the coupling region of the heat introduction unit facing away from the housing.

9. The heat storage device as claimed in claim 1, wherein the coupling region of the heat introduction unit and/or the heat discharge unit is arranged in an enclosure, wherein the enclosure is arranged at least in regions within the receptacle chamber and/or the receptacle space.

10. A heat storage device, having a metallic phase change material as a storage material, comprising at least one receptacle chamber having a receptacle space for the storage material and a housing for the receptacle space, at least one heat introduction unit for introducing heat into the at least one receptacle chamber, and at least one heat discharge unit for discharging heat from the at least one receptacle chamber, wherein a coupling region of the heat introduction unit provided for thermal coupling with the storage material and/or a coupling region of the heat discharge unit provided for thermal coupling with the storage material is arranged spaced apart at least in regions from the storage material, wherein the coupling region of the heat introduction unit and/or the heat discharge unit is arranged in an enclosure, wherein the enclosure is arranged at least in regions within the receptacle chamber and/or the receptacle space, and wherein a central element of the heat discharge unit is arranged in the enclosure, and elements of the heat introduction unit are arranged spaced apart from the element, wherein the elements of the heat introduction unit are arranged mirror-symmetrically or rotationally symmetrically to the element.

11. A heat storage device, having a metallic phase change material as a storage material, comprising at least one receptacle chamber having a receptacle space for the storage material and a housing for the receptacle space, at least one heat introduction unit for introducing heat into the at least one receptacle chamber, and at least one heat discharge unit for discharging heat from the at least one receptacle chamber, wherein a coupling region of the heat introduction unit provided for thermal coupling with the storage material and/or a coupling region of the heat discharge unit provided for thermal coupling with the storage material is arranged spaced apart at least in regions from the storage material, wherein the coupling region of the heat introduction unit and/or the heat discharge unit is arranged in an enclosure, wherein the enclosure is arranged at least in regions within the receptacle chamber and/or the receptacle space, and wherein a central element of the heat introduction unit is arranged in the enclosure, and a plurality of elements of the heat discharge unit are arranged spaced apart from this element, wherein the elements of the heat discharge unit are arranged mirror-symmetrically or rotationally symmetrically to the element of the heat introduction unit.

12. The heat storage device as claimed in claim 1, wherein the heat introduction unit has at least one element having the coupling region, having at least one of the embodiments:
the coupling region essentially comprises an entire length of the element in the receptacle space and/or an entire circumference of the element and/or an entire circumference of the element in the receptacle space;
the coupling region extends over at least 50% of an entire height of the receptacle space;
the element or the coupling region of the element is spaced apart from the housing and one end of the element is spaced apart from a cover and/or a base of the housing;
the element or the coupling region of the element is oriented in parallel to an element of the heat discharge unit;
the element or the coupling region of the element is oriented in parallel to a vertical axis (L) or axis of symmetry of the receptacle space;
the element or the coupling region of the element is arranged centrally in the receptacle space.

13. The heat storage device as claimed in claim 12, wherein the at least one element is arranged inclined to an orientation of the at least one heat discharge unit, and/or is arranged in parallel to a direction of gravity(S) in the intended working state, or wherein the at least one element is arranged in parallel to an orientation of the at least one heat discharge unit.

14. The heat storage device as claimed in claim 1, wherein the heat discharge unit has at least one element having the coupling region, having at least one of the embodiments:
the coupling region essentially comprises an entire length of the element in the receptacle space and/or an entire circumference of the element and/or an entire circumference of the element in the receptacle space;
the coupling region extends over at least 50% of an entire height of the receptacle space;
the element or the coupling region of the element is spaced apart from the housing and one end of the element is spaced apart from a cover and/or a base of the housing;
the element or the coupling region of the element is oriented in parallel to an element of the heat introduction unit;
the element or the coupling region of the element is oriented in parallel to a vertical axis (L) or axis of symmetry of the receptacle space;
the element or the coupling region of the element is arranged centrally in the receptacle space.

15. The heat storage device as claimed in claim 14, wherein the at least one element is formed as a pipe.

16. The heat storage device as claimed in claim 14, wherein the at least one element is arranged centrally in the receptacle space.

17. A heat storage device, having a metallic phase change material as a storage material, comprising at least one receptacle chamber having a receptacle space for the storage material and a housing for the receptacle space, at least one heat introduction unit for introducing heat into the at least one receptacle chamber, and at least one heat discharge unit for discharging heat from the at least one receptacle chamber,
wherein
a coupling region of the heat introduction unit provided for thermal coupling with the storage material and/or a coupling region of the heat discharge unit provided for thermal coupling with the storage material is arranged spaced apart at least in regions from the storage material, and
wherein the heat introduction unit in the receptacle space surrounds the heat discharge unit at least with a section.

18. The heat storage device as claimed in claim 1, wherein the heat introduction unit is at least partially spaced apart in the receptacle space from the heat discharge unit, wherein storage material is arranged between the heat introduction unit and the heat discharge unit.

19. The heat storage device as claimed in claim 1, wherein the storage material comprises a metallic alloy having one or more of the components aluminum, silicon, copper, magnesium, zinc, germanium.

20. The heat storage device as claimed in claim 1, wherein the heat introduction unit has at least one heating device.

21. The heat storage device as claimed in claim 1, wherein a heat transfer medium flows through the heat discharge unit.

* * * * *